United States Patent [19]
Anderholm

[11] Patent Number: 6,021,220
[45] Date of Patent: Feb. 1, 2000

[54] SYSTEM AND METHOD FOR PATTERN RECOGNITION

[75] Inventor: Eric J Anderholm, LaCrosse, Wis.

[73] Assignee: Silicon Biology, Inc., Plymouth, Minn.

[21] Appl. No.: 08/798,938

[22] Filed: Feb. 11, 1997

[51] Int. Cl.$^7$ .................................................. G06K 9/46
[52] U.S. Cl. ........................... 382/194; 382/224; 382/228
[58] Field of Search .................................... 382/194, 190, 382/195, 198, 243, 212, 149, 228, 224; 380/30

[56] References Cited

U.S. PATENT DOCUMENTS

| | | | |
|---|---|---|---|
| 3,560,930 | 2/1971 | Howard | 340/146.3 |
| 4,606,069 | 8/1986 | Johnsen | 382/243 |
| 4,907,274 | 3/1990 | Nomura et al. | 380/30 |
| 4,935,877 | 6/1990 | Koza | 364/513 |
| 4,955,060 | 9/1990 | Katsuki et al. | 382/212 |
| 5,003,613 | 3/1991 | Lovelady et al. | 382/17 |
| 5,048,107 | 9/1991 | Tachikawa | 382/48 |
| 5,335,292 | 8/1994 | Lovelady et al. | 382/17 |
| 5,341,142 | 8/1994 | Reis et al. | 342/64 |
| 5,386,103 | 1/1995 | DeBan et al. | 235/379 |
| 5,432,864 | 7/1995 | Lu et al. | 382/118 |
| 5,521,991 | 5/1996 | Billings | 382/317 |
| 5,544,256 | 8/1996 | Brecher et al. | 382/149 |
| 5,703,964 | 12/1997 | Menon et al. | 382/228 |

OTHER PUBLICATIONS

Goldberg, D.E., *Genetic Algorithms in Search, Optimization, and Machine Learning*, Addison–Wesley Publishing Company, Inc., Cover page, Title page, pp. 1–54, 94–97 (1989).

Hecht–Nielsen, R., *Neurocomputing*, Addison–Wesley Publishing Company, Cover page, Title page, pp. 323–325, 413 and 415 (1990).

Holland, J.H., *Adaptation in Natural and Artificial Systems*, A Bradford Book, The MIT Press, Cambridge, MA, Cover page, Title page, pp. 6–9 (1992).

Kinnear, Jr. K.E., "A Perspective on the Work in this Book", *Advances in Genetic Programming*, ed. Kenn, th E. Kinnear, Jr., Cover page, pp. 4–19 (1993) (Title page information obtained from Dialog printout).

Koza, J.R., "Introduction to Genetic Programming", *Advances in Genetic Programming*, ed. Kenneth E. Kinnear, Jr., Cover page, first pg unnumbered, pp. 22–25, 41–42 (1993) (Title page information obtained from Dialog printout).

Cavnar, W. et al., "Using Superimposed Coding of N–Gram Lists for Efficient Inexact Matching," *Environmental Research Institute of Michigan*, 13 pgs. (undated).

Gage, P., "Random Access Data Compression," *C/C++ Users Journal*, 15(9):23–28, 30 (Sep. 1997).

*Primary Examiner*—Jose L. Couso
*Assistant Examiner*—Ahn Hong Do
*Attorney, Agent, or Firm*—Merchant & Gould P.C.

[57] ABSTRACT

A method and system includes a method for generating a classifier from a set of collected sample patterns for use in pattern recognition. The sample patterns are representative of data to be processed by the classifier and are converted to electronic signals to be manipulated by a programmed computer. Further, the method and system generate and identify a number of transformers that map between sample patterns of the same pattern-type in the collected sample patterns. The method and system use the transformers and the sample patterns to generate additional patterns. The method and system then forms a table that contains the generated patterns and an indication of the pattern-type to which each pattern belongs. The process repeats the steps of generating additional patterns and forming a table until a measure accuracy for the mapping of the sample patterns and transformers do not provide an acceptable improvement.

16 Claims, 37 Drawing Sheets

FIG. 16C

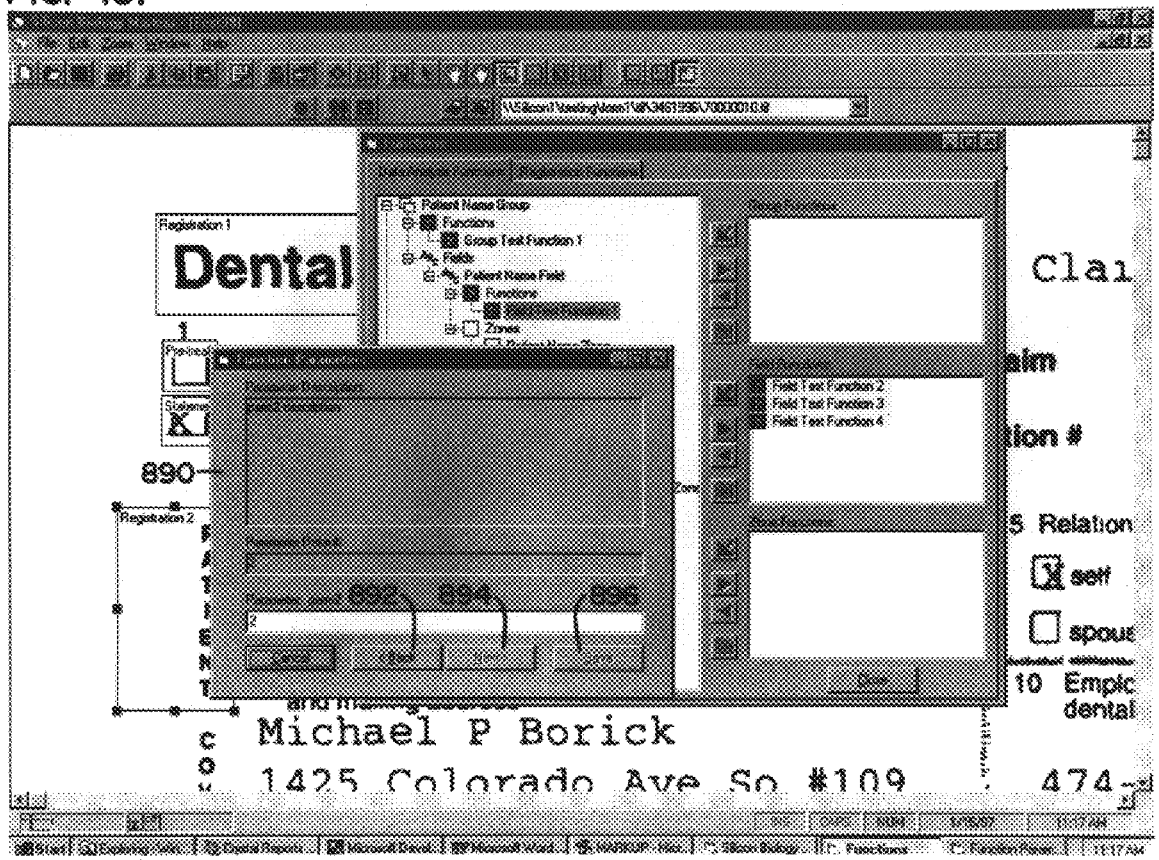

FIG. 16I

Dental Claim Form

SYSTEM AND METHOD FOR PATTERN RECOGNITION

TECHNICAL FIELD OF THE INVENTION

The present invention relates generally to the field of electronics and, in particular, to a system and method for pattern recognition.

BACKGROUND OF THE INVENTION

Computers and other electronic systems are being used in diverse ways to replace operations that traditionally have required intensive human labor. For example, computer controlled robotic systems are becoming commonplace in assembly lines as a labor saving measure. These systems allow companies to control rising costs while providing the same or better quality output. Designers have found that these types of systems are especially effective in performing repetitive processes where the input to the system is known.

Computer or electronics based systems have not been as successful in other areas. For some systems to operate properly, the system must recognize an input from among a wide range of possible inputs. For example, many have experienced the frustration of trying to scan a document into a computer for use in a word processing application. Conventional optical character recognition (OCR) systems used with the scanners to create a word processing document from the scanned image are highly inefficient. A large percentage of the characters are misread by the OCR system, thus requiring a thorough review and editing of the document before it can be used. One contributing cause is that conventional OCR systems do not include an effective "classifier." Other systems similarly cannot be automated because accurate classifiers have not been built with current technology.

A "classifier" is a system that identifies an input by recognizing that the input is a member of one of a number of possible classes. Theoretically, the best type of classifier is a Bayes-Type classifier. A Bayes classifier contains a complete list of all possible inputs and the corresponding classification for each input. For most if not all real world applications, it is not possible to gather samples of all possible inputs to the system. Rather than attempt to build a Bayes Classifier, current systems use a neural network to extrapolate from a small sampling of possible inputs. The neural network typically is trained with the sampling of data and uses various algorithms based on error estimation to classify unknown inputs. Such systems have limited success because the system operates based on error estimation from a small sampling of data.

For the reasons stated above, and for other reasons stated below which will become apparent to those skilled in the art upon reading and understanding the present specification, there is a need in the art for an improved system and method for pattern recognition.

SUMMARY OF THE INVENTION

The above mentioned problems with pattern recognition systems and other problems are addressed by the present invention which will be understood by reading and studying the following specification.

In one embodiment, a method for generating a classifier from a set of collected sample patterns is provided. The sample patterns are representative of data to be processed by the classifier and are converted to electronic signals to be manipulated by a programmed computer. Further, the method generates and identifies a number of transformers that map between sample patterns of the same pattern-type (e.g., all letters "a" are of the same "pattern-type") in the collected sample patterns. The method uses the transformers and the sample patterns to generate additional patterns. The method forms a table that contains the generated patterns and an indication of the pattern-type to which each pattern belongs. In one embodiment, the table also includes an indication of the confidence (the number of patterns of a particular pattern-type in a class) and noise (how many transformers have been applied to an original sample pattern to derive the pattern in this class) associated with each pattern-type in each class of the table.

In another embodiment of the present invention, the classifier is used for recognizing patterns in a recognition system. First, a digital image of one or more physical items is generated. Features are extracted from the digital image and a numerical representation of each feature is generated. The numerical representation is used as a reference to look into a look-up table to determine candidate patterns wherein the look-up table was generated by using the technique described above. A candidate pattern is selected using selected validation modules that determine the pattern-type of the pattern. The validation modules used in a specific application may be selected by the user thus making the system applicable to a wide variety of applications. In one embodiment, the validation modules use the confidence and noise factors to select among candidate patterns. Further, in another embodiment, a file containing the coordinates of the extracted features is modified by the validation modules after the initial feature extraction process when the validation modules determine new coordinates for a feature. This allows the system to compensate for initial errors in the feature extraction process when more data is available to determine more accurately the location of each feature based on the context in which the feature is encountered.

In another embodiment, a pattern recognition system is provided. The system includes a memory device that receives a digital image of a physical item. The system further includes a feature extractor circuit that is coupled to receive the digital image from the memory. The feature extractor circuit being operable to extract features from the digital image and being operable to generate a numerical representation of each feature. The system also includes a recognizer coupled to receive data from the feature extractor and to select an entry in a look-up table using the numerical representation to determine candidate patterns. The look-up table of the recognizer is of the type that is generated by using a number of sample patterns and at least one transformer to generate patterns by applying the transformer to the sample patterns. The system also includes a processor coupled to the recognizer, feature extractor and memory that coordinates the operation of the recognizer, memory and feature extractor, and that selects among the candidate patterns with selected validation modules that determine the proper pattern for the extracted features. In one embodiment, a file is loaded into memory that includes a hierarchical relationship between areas of the physical item that define where data is to be taken from the physical item. Validation modules are selectively associated with the different areas. In one embodiment, the file is created using a graphical user interface to mark-up a sample digital image.

DETAILED DESCRIPTION OF THE INVENTION

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

The present invention provides a system and method for recognizing patterns. For illustrative purposes only, several aspects of the present invention are described in terms of examples relating to recognition of alpha-numeric characters. These examples are provided by way of illustration, for pedagogical purposes only, and are not to be construed as limitations on the scope of the present invention. In other implementations, the teachings of the present invention may be applied to pattern recognition in fields such as medicine (e.g., identifying cancerous cells in a tissue sample), transportation or robotics (e.g., real time collision-avoidance systems) and other applications in which pattern recognition can be used to classify input signals.

At a general level, embodiments of the present invention teach a pattern recognition system that uses a Bayes-type classifier. Part I below provides an illustrative embodiment of a method for producing a Bayes-type classifier according to one embodiment of the present invention. Part III of the detailed description provides an illustration of an application of the Bayes-type classifier in a pattern recognition system. Part II provides a description of two basic functions or steps used in generating or applying the classifier as described in Parts I and III. Namely, Part II describes methods for extracting features from an image and generating a numerical representation of an extracted feature. Finally, Part IV provides a description of the operation and function of validation modules in the pattern recognition process.

I. Generating a Classifier

Figure 1:
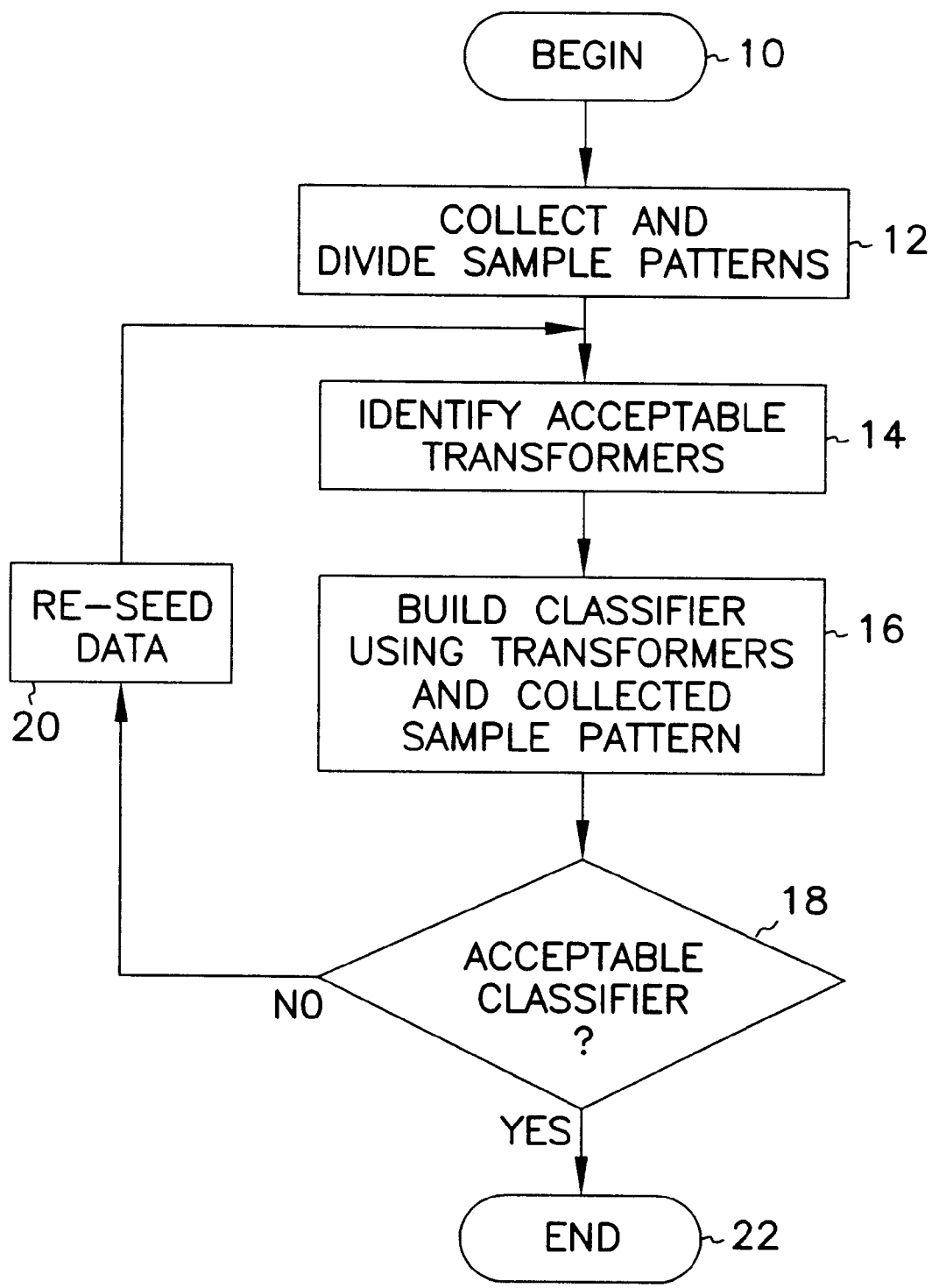
FIG. 1 is a flow chart that illustrates an embodiment of a method for generating a classifier according to the teachings of the present invention.

FIG. 1 is a flow chart that illustrates an embodiment of a method for generating a classifier according to the teachings of the present invention. As defined above, a "classifier" is a system that identifies what is represented by a pattern received by the classifier. The classifier outputs an indication of the "pattern-type" of the input. For example, in the context of character recognition, the pattern-type output of the classifier corresponds to the alpha-numeric character that is represented by an input pattern of pixels. In some circumstances, the classifier cannot definitively identify what is represented by the pattern since some patterns may correspond to multiple pattern-types. For example, the capital letter "I" and the lower case letter "1" may be represented by the same "pattern" at some level of resolution. To resolve these ambiguities, a recognition system constructed according to the teachings of the present invention uses contextual information to select from among multiple pattern-types as described in more detail below in part III. The focus of this part I is the generation of the Bayes-type classifier.

A Bayes-type classifier is essentially a large look-up table. The table includes a list of numbers that correspond to the "classes" that may be encountered by the classifier in identifying patterns. A list of one or more pattern-types (e.g., alpha-numeric characters) is associated with each number or class. Each pattern-type in a class is also identified by "noise" and "confidence" factors that are derived during the generation of the classifier. These terms are defined in more detail below.

The method of FIG. 1 generates a Bayes-type classifier using only a small collection of sample patterns that is representative of the pattern-types to be classified by the classifier. The pattern-type of each sample pattern used to generate the classifier is known. The method uses the sample patterns to generate an extremely large set of additional patterns without the need to manually collect all of the patterns for the classifier. In other words, the method extrapolates from a basic set of pattern-types to create a "universe" of identifiable patterns that is substantially complete. The method does not produce all conceivable patterns from the sample patterns, but produces and classifies sufficient patterns for each pattern-type to generate a highly accurate classifier.

The method begins at block 10. At block 12, the method collects sample patterns that include samples of each pattern-type of input to be identified by the classifier. In the context of OCR, the samples include 100 or more different characters. The method collects the sample patterns from multiple sources. In this embodiment, the method gathers a sample of each character from 100 or more sources. The sample patterns can be provided by individuals in the form of handwriting or by mechanical means in the form of various machine-generated fonts. Each source provides, for example: two samples of each letter of the alphabet (capital and small letters), and additional miscellaneous typographical characters that the classifier is likely to encounter such as the characters set out in Table 1 below. It is noted that the characters in Table 1 are shown by way of example and not by way of limitation. Other combinations of characters could be selected for a classifier based on specific needs of a pattern recognition system.

TABLE 1

Sample of Character for Character Recognition Application

| 0 | 1 | 2 | 3 | 4 | 5 | 6 | 7 | 8 | 9 |
|---|---|---|---|---|---|---|---|---|---|
| A | B | C | D | F | F | G | H | I | J |
| K | L | M | N | O | P | Q | R | S | T |
| U | V | W | X | Y | Z | a | b | c | d |
| e | f | g | h | i | j | k | l | m | n |
| o | p | q | r | s | t | u | v | w | x |
| y | z | ! | @ | # | $ | & | * | ( | ) |
| - | _ | + | = | [ | ] | { | } | \ | \| |
| ; | : | " | ' | / | ? | , | . | < | > |
| ` | ~ | ^ | § | ¶ | ® | © | ½ | ¼ | ¾ |

The method collects approximately 10,000 samples with at least 100 samples of each pattern-type.

From the set of sample patterns collected in this step, the method divides out a representative set of patterns that includes at least one sample pattern of each pattern-type, e.g., one letter "A," one letter "B," etc. Another set of sample patterns is separated out for use in a subsequent step and is labeled the "generating set." The generating set typically includes on the order of 10 to 20 percent of each pattern-type of the collected sample patterns. The remaining sample patterns comprise a set referred to as the "testing set" that is used during later steps to test the effectiveness of the generated classifier.

Once the sample patterns are collected and divided, the sample patterns are converted to numerical representations that are capable of manipulation and analysis by a programmed computer. First, the sample patterns are converted to a digital format such as by scanning a document containing the samples. For purposes of this specification, the digital format of a pattern is referred to as an "image." Once scanned, patterns or "features" are "extracted" from the image using, for example, the technique described below with respect to FIG. 7. Further, the extracted features may be converted to a numerical representation using, for example, the technique of FIG. 8. A dual-processor DEC Alpha computer with a clock speed of 250 MHz available from Digital Equipment Corporation of Maynard, MA is programmed to perform the steps of blocks 14, 16 and 18 using this data.

At block 14, the method creates a number of tools for use in extrapolating a large set of patterns from the small set of sample patterns of the generating set. The tools are referred to herein as "transformers." A transformer is an operation that modifies the numerical representation of a pattern. The method generates and tests potential transformers to see which transformers, when applied to sample patterns in the generating set, accurately generate additional patterns of the same pattern-type. Transformers that accurately generate patterns of the same pattern-type are referred to as "fit." Fit transformers indicate what changes can be made to a pattern of a known pattern-type such that the modified pattern is of the same pattern-type. For example, in the character recognition context, transformers that are "fit" when applied to a letter "a" produce a modified "a" as an output that can still be recognized as a letter "a." If a transformer alters a letter enough such that the output is a different letter, e.g., the transformer changes a letter "a" to a letter "o," then the transformer is unfit. Genetic algorithms are used to modify fit transformers so as to create additional transformers for testing with the generating set. The process of creating and testing transformers to identify fit transformers is described in detail with respect to FIG. 2.

At block 16, the method uses the fit transformers identified at block 14 to extrapolate from the samples patterns of the generating set to produce additional sample patterns for each pattern-type. The generated patterns provide the method with the data necessary to build the Bayes-type classifier.

The method selects sample patterns in the generating set and associated, fit transformers and applies the transformers to the sample patterns. This produces additional patterns. The method uses the generated patterns and the sample patterns to create a classifier. As mentioned above, the classifier is basically a large look-up table that includes at least two columns. The first column includes the numerical representation of each pattern and the second column includes the identification of the associated pattern-type or pattern-types for the numerical representation. Each row of the table represents a "class" of the classifier.

Along with the pattern-types, the second column also includes two additional pieces of information for each identified pattern-type: nanely, noise and confidence. The noise factor is a count of how many transformers have been applied to an original sample pattern to derive the numerical representation of the class for the row. The confidence factor is an indication of the number of patterns of a particular pattern-type in the class, e.g., how many letter times did the letter "A" map to the numerical value of a class. The noise and confidence parameters can be used by validation modules to assist in selecting among pattern-types within a single class. The method tests the classifier using the patterns in the testing set. In one embodiment, the method generates additional patterns from the transformers and sample patterns of the generating set.

At block 18, the method determines whether the generated classifier is acceptable. Many factors can be considered in this analysis. For example, the error rate from tests in block 16 with the testing set can be used. Further, the size of the classifier can also be considered. If the method did not produce an acceptable classifier, the method proceeds to block 20 and re-seeds the representative set with additional patterns and returns to block 14 to identify additional transformers. If the classifier is acceptable, the method ends at block 22.

Figure 2:
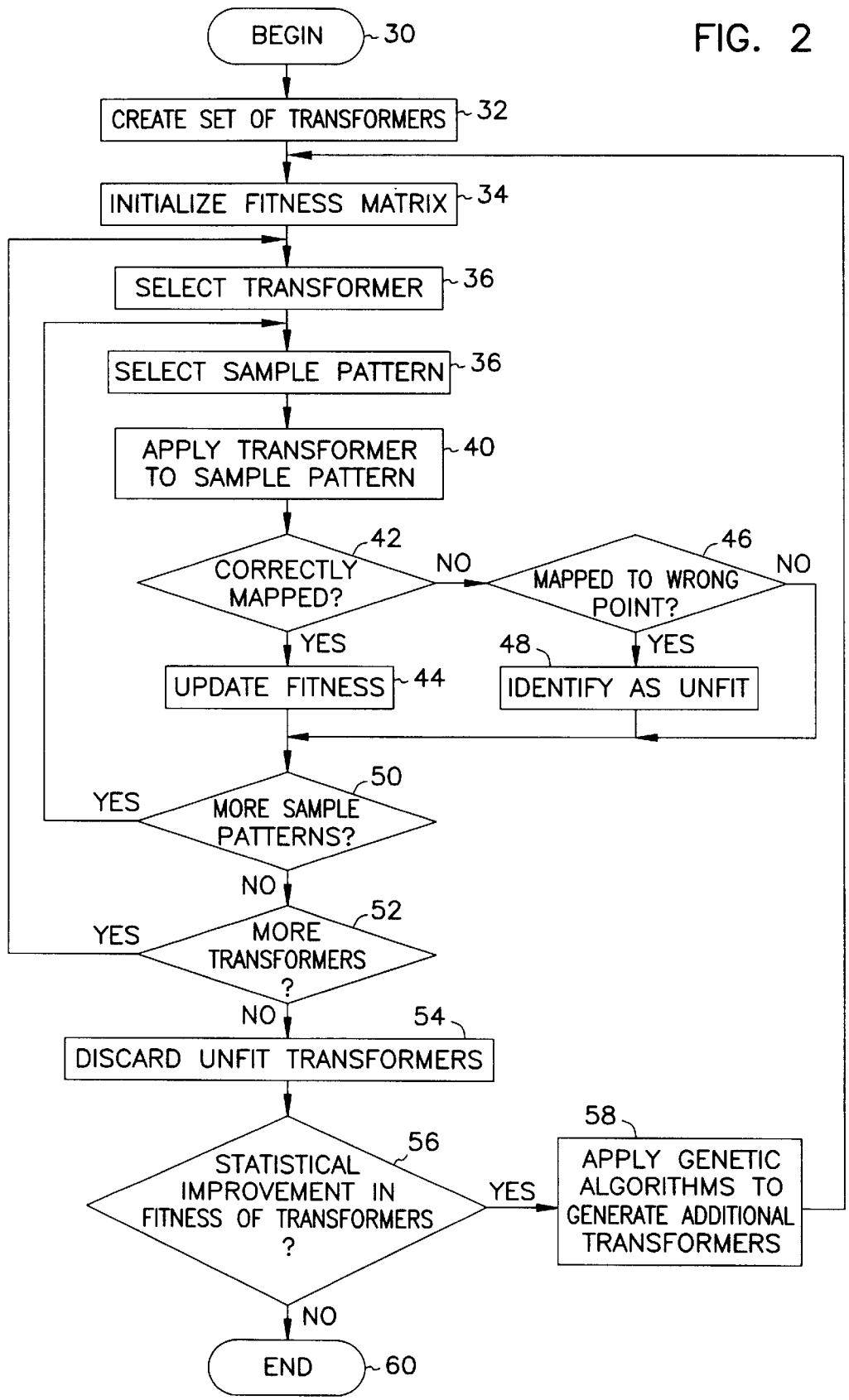
FIG. 2 is a flow chart that illustrates an embodiment of a method for identifying acceptable transformers according to the teachings of the present invention.

FIG. 2 is a block diagram of an embodiment of a method for identifying acceptable transformers to be used in building a classifier according to the teachings of the present invention. Advantageously, the method uses genetic algorithms to modify acceptable transformers to find additional transformers. The method begins at block 30.

At block 32 the method creates an initial set of transformers. The transformers used in a specific application may vary depending on the type of patterns that are being recognized by the classifier. The transformers are created by concatenating a number of elemental operations. Table 2 describes some elemental operations that may be used in creating transformers in, for example, the character recognition context. It is noted that these elemental operations may be applicable outside the context of character recognition.

TABLE 2

Elemental Operations

| Elemental Operation | Description |
| --- | --- |
| scale | Scale (up or down) the size of the pattern by a percentage in the X and Y directions (0.5 to 1.5 in increments of 0.1). |
| rotation | Rotate an image around mid-point (−5 to +5, in 1 increments). |
| skewX | Fix the location of the bottom of the image and move the top of the image left or right (4%). Move the lines in between a linear amount left or right. |
| skewY | Fix the location of the left side of the image and move the right side of the image up or down (4%). Move the lines in between a linear amount up or down. |
| thin | Remove boundary pixels of the pattern until only skeleton of the pattern remains. |
| vary_window | Add or subtract n rows or columns of pixels at the boundaries of the image. Note that this operation is applied to all sides of the image. |
| thick | Add pixels at the boundary of the pattern (1, 2, 3, or 4 layers). |
| add_linesX | Add 1 or 2 lines of pixels parallel to top boundary of the image in the x direction; if the pixel below or above is set, the pixel in the new line is set. |
| add_linesY | Add 1 or 2 lines of pixels parallel to left boundary of the image in the y direction; if the pixel to the right or left is set, the pixel in the new line is set. |
| add_pixels | Randomly select pixels; if it is next to a set pixel, then set the selected pixel. If at boundary of image, increase boundary size. Number of pixels set not to exceed 10% of the image pixels. |

The method randomly selects elemental operations for a transformer. Specifically, in this embodiment, the method creates a table of the elemental operations with an index number for each operation. The method uses a random number generator to index into the list and selects ten elemental operations for each transformer. From some initial testing, it was determined that ten elemental operations per transformer provides acceptable results in the character recognition context; five elemental operations is too few and thirty elemental operations is too many. The appropriate number of elemental operations is a function of the computing power used to build the classifier, the diversity of the collected samples, and the nature of the elemental operations. Initially, the method generates, for example, between 100,000 and 200,000 transformers for testing.

At block 34, the method creates and initializes a fitness matrix that is used to track the fitness of each transformer for each pattern of the representative set. Thus, in this case, the fitness matrix would be 100 by 100,000 to 200,000, depending on the number of transformers. Each cell of the matrix is initialized to zero.

The method applies each transformer to each sample pattern in the representative set and records the results in an associated cell of the fitness matrix. Specifically, the method selects a transformer at block 36. At block 38, the method selects a sample pattern and applies the selected transformer to the selected sample pattern at block 40 to produce a modified pattern. At block 42, the method determines whether the modified pattern of block 40 is in the generating set. This equivalence relation is determined by comparing the numerical representation of the modified pattern with the numerical representations of the patterns of the generating set. It is noted that these numerical representations are created using the technique of FIG. 8.

If the method finds a match between the modified pattern from block 40 and a member of the generating set of the same pattern-type, the method proceeds to block 44 and records the match in one of the cells of the fitness matrix. For example, the method can add one to the cell of the fitness matrix associated with the pattern and the transformer. If, however, the method did not find a match at block 42, the method proceeds to block 46 and determines whether the modified pattern of block 40 matches a pattern of the generating set that is not of the same pattern-type as the modified pattern. If the method finds a match at block 46, the method identifies the transformer as unfit for this pattern-type because the transformer changed the pattern-type of the character in block 40. In other words, the method found, for example, that a transformed "a" matched the numerical representation of a letter "o" of the generating set. At block 48, the method assigns, for example, a value of "−1" to the entry of the matrix for this transformer and sample pattern indicating that the transformer is not fit for this pattern-type.

If the method does not find a match at block 46, the method proceeds to step 50 and determines if all of the sample patterns in the representative set have been tested for the current transformer. If all of the sample patterns have not been tested, the method returns to step 38 and selects the next sample pattern. If, however, all sample patterns have been tested, the method proceeds to step 52 and determines whether there are more transformers that have not yet been tested against the sample patterns of the representative set. If there are more untested transformers, the method returns to block 36 and selects the next transformer. If, however, the all transformers have been tested, the method is finished with this set of transformers and proceeds to block 54.

At block 54, the method discards the unfit transformers for associated pattern types. At block 56, the method performs a statistical comparison of the remaining transformers. For example, the method may calculate the standard deviation and mean value of the entries in the fitness matrix. If the statistics for the fitness matrix do not improve over a prior iteration, the method terminates at block 60. If, however, the fitness matrix shows a statistical improvement, the method proceeds to block 58. At block 58, the method uses genetic algorithms to produce additional transformers to be used in another iteration. For example, the method randomly selects a number of transformers and applies: point mutation, cross-over, or aging algorithms. Point mutation consists of selecting an elemental operation in the string of a transformer and randomly replacing the selected elemental operation with a different elemental operation. The cross over algorithm uses two transformers and selects a number of the elemental operations at an end of each transformer and swaps the elemental operations between the two transformers. The aging algorithm allows a transformer to go unchanged so that it performs the same operation in the next generation of patterns that are created. After applying the genetic algorithms to generate a new set of transformers, the method returns to block 34 and repeats the process for determining the fitness of these transformers. Ultimately, the method identifies a number of acceptable transformers for use with the sample patterns and ends at block 60.

The method of FIG. 2 was tested using the elemental operations of Table 2 to select transformers for use in generating a classifier for an character recognition system. Two separate sets of transformers were generated. For the first set of transformers, samples of machine print only were used. With the second set of transformers, samples of hand-print only were used. Table 3 below indicates the percentage of the elemental operations found in the transformers generated using the method of FIG. 2 in this implementation.

TABLE 3

Percentage of Elemental Operations

| Elemental Operation | Machine Print | Hand Print |
|---|---|---|
| scale | 1 | 5 |
| rotation | 0 | 3 |
| skewX | 0 | 8 |
| skewY | 0 | 5 |
| thin | 0 | 0 |
| vary_window | 99 | 76 |
| thick | 0 | 0 |
| add_linesX | 0 | 2 |
| add_linesY | 0 | 1 |
| add_pixels | 0 | 0 |

Figure 5:
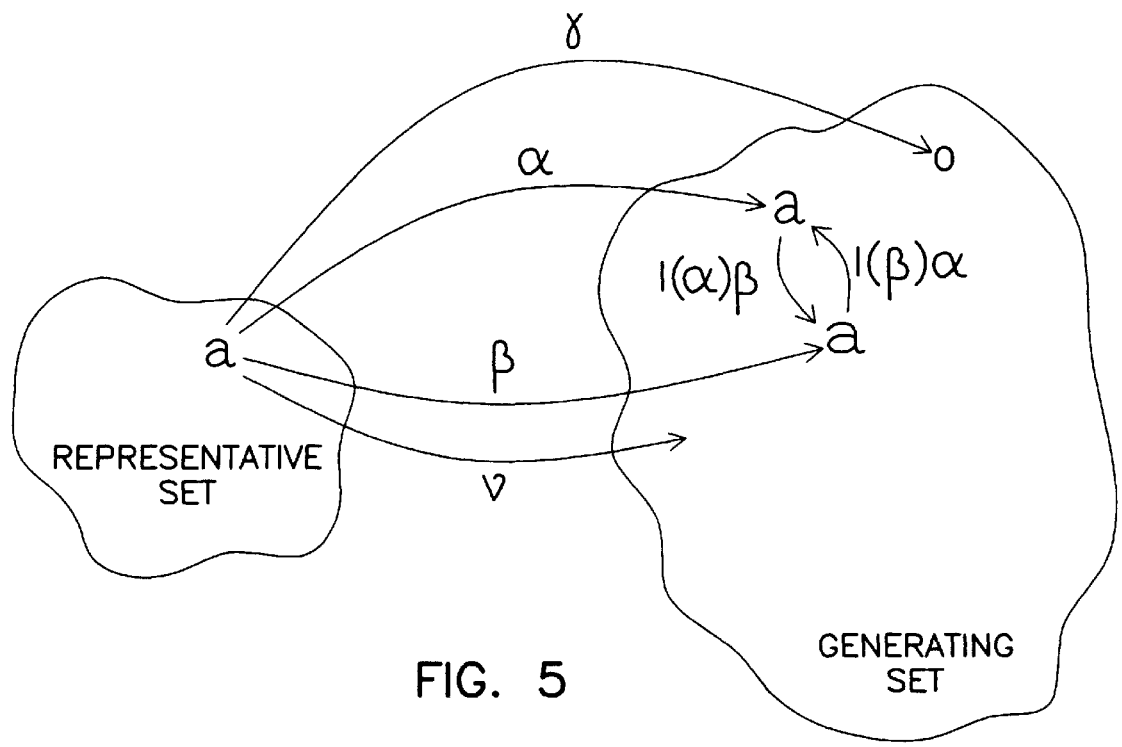
FIG. 5 is a diagram that illustrates the manner in which transformers map sample patterns of a representative set to sample patterns of a generating set.

FIG. 5 is a diagram that graphically illustrates some aspects of the process applied in FIG. 2 using an example from a character recognition application. Specifically four transformers, α, β, γ, and ν are illustrated. Each transformer operates on a sample pattern of the representative set. In this case the sample pattern is a letter "a." Transformers α and β map the letter "a" in the representative set to other a's in the generating set. Thus, the method identifies transformers α and β as being "fit" for use with the letter "a." By using invertible transformers, additional transformers can be calculated to map between patterns of the generating set based on transformers that map characters from the representative set to the generating set. As shown in FIG. 5, the nomenclature I(x) represents the inverse of the function x. Transformer γ maps the letter "a" of the representative set to the letter "o." Thus, γ is not fit for the letter "a". Further, the transformer ν when applied to the letter "a" produces a character that is not in the generating set. Thus, this application provides no information on the fitness of the transformer.

Figure 3A:
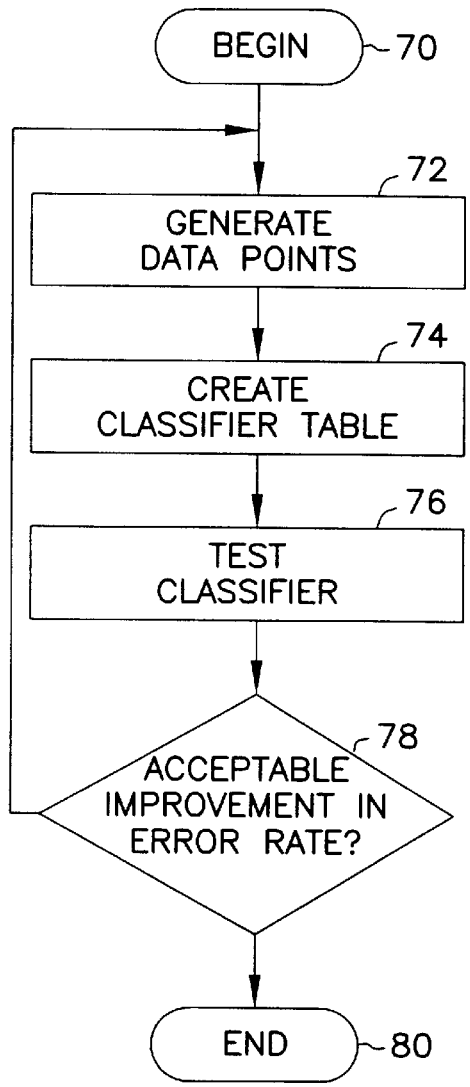
FIG. 3A is a flow chart that illustrates an embodiment of a method for building a classifier using transformers and a number of sample patterns according to the teachings of the present invention.

FIG. 3A is a flow chart that illustrates an embodiment of a method for building a classifier using transformers according to the teachings of the present invention. The method begins at block 70 and generates patterns at block 72. In one embodiment, the method generates the patterns using a number of transformers that accurately map between patterns of the same pattern-type. These transformers are derived, for example, using the technique shown and described in the context of FIG. 2. The method applies these transformers to the sample patterns to generate new patterns. At block 74, the method generates a table to be used as a classifier. The table includes two columns. The first column includes a numerical representation of each of the generated patterns and collected sample patterns. The second column includes the identity of the pattern-types that match the numerical representation. The second column also includes an indication of the noise and confidence for each pattern-type. At block 76, the method tests the classifier using a set of sample patterns with known pattern-types. The method keeps track of incorrect classification of the test patterns. At block 78, the method determines if the error rate improves over a prior level. If the error rate improves, the method returns to block 72 and generates more patterns to expand the scope of the classifier. If, however, the error rate does not improve, the method terminates at block 80. This means that the additional patterns generated in this pass either did not fall in the test patterns or produced patterns wherein pattern-type was changed by the transformers from one pattern-type to another.

Figure 3B:
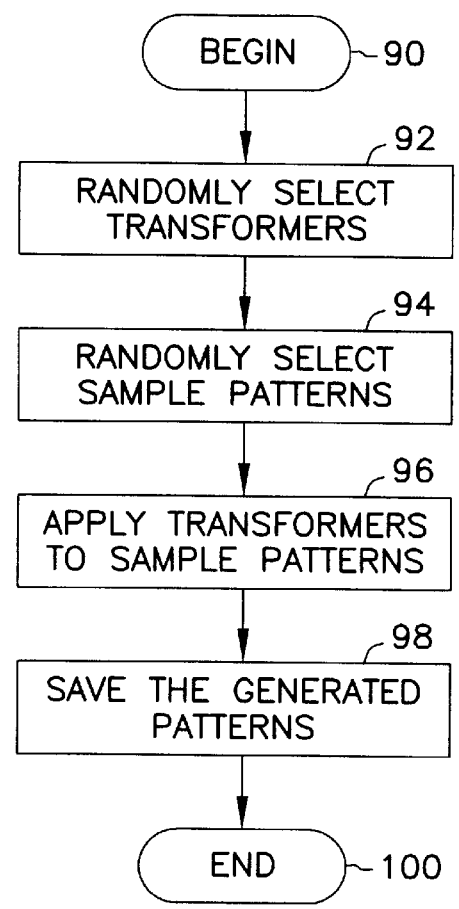
FIG. 3B is a flow chart that illustrates an embodiment of a method for generating patterns from a set of sample patterns using a set of transformers according to the teachings of the present invention.

FIG. 3B is a flow chart that illustrates a method for generating patterns using transformers according to the teachings of the present invention. The method begins at block 90 and randomly selects a subset of the transformers at block 92. The method also randomly selects, at block 94, a number of the sample patterns. At block 96, the method applies the transformers to the sample patterns to generate additional patterns. At block 98, the method saves the generated patterns. The method terminates at block 100.

II. Feature Extraction and Numerical Representation of Features

Two basic functions or steps used in generating and using a classifier of the type described above include: feature extraction and numerical representation of features. Features (e.g., patterns of pixels) are extracted from a larger image. The extracted features are typically converted into strings of binary numbers to be used in classifying the extracted feature. Each of these factions or steps is described in turn below.

Figure 7:
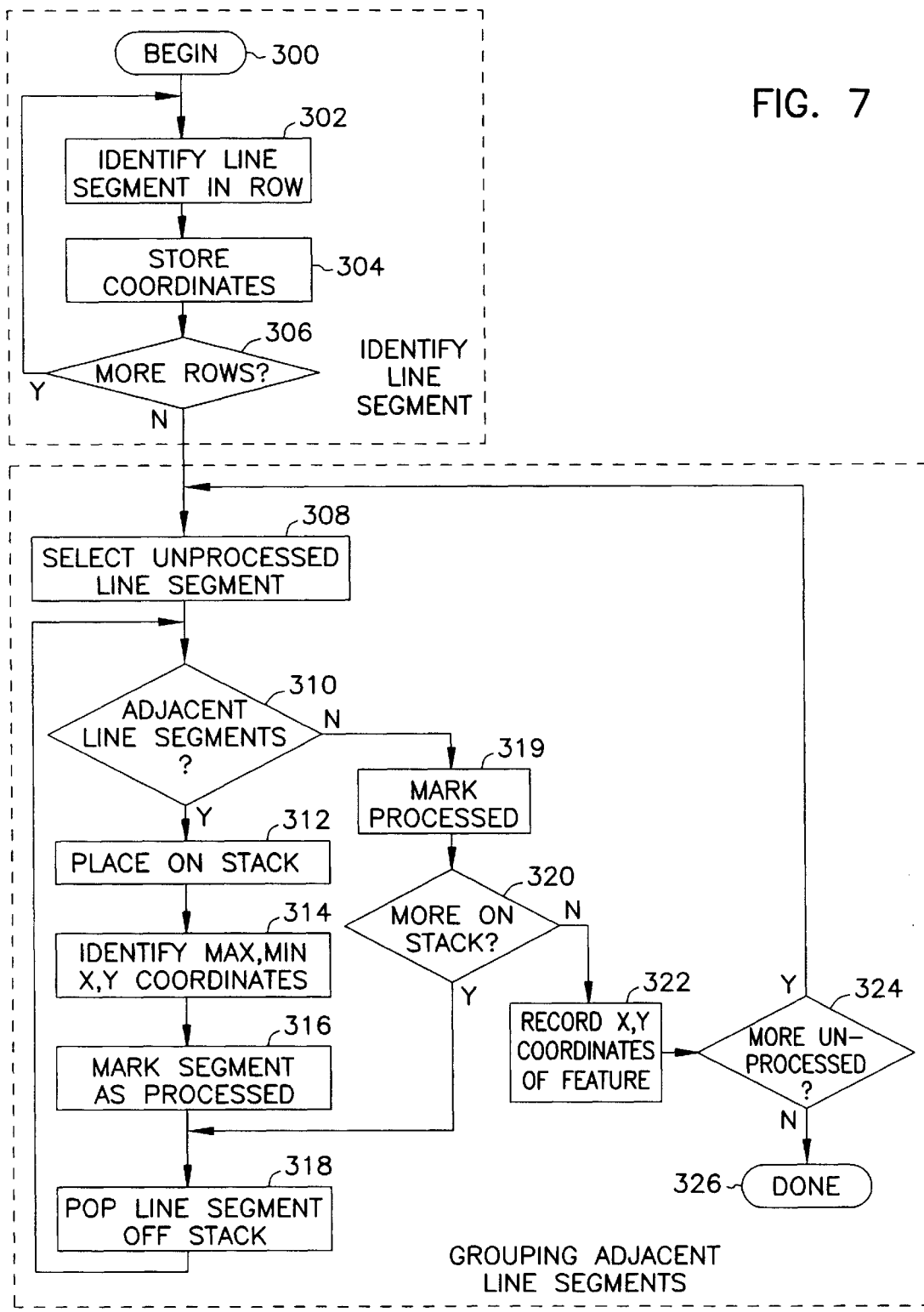
FIG. 7 is a flow chart that illustrates a method for extracting features or patterns from a digital representation of an image according to one aspect of the present invention.

A feature extractor determines which portions of an image contain possible patterns to be classified. The feature extractor thus reduces the processing load on the system by honing in on the relevant portions of the image. FIG. 7 is a flow chart that illustrates an embodiment of a method for extracting a feature from a digital representation of an image. It is noted that feature extraction can be implemented as an Application Specific Integrated Circuit (ASIC) or could be implemented in software by a programmed computer.

In one embodiment, the feature extractor uses a two-step process to extract patterns or features from an image. The image comprises an array of pixels arranged in a number of rows and columns. Each pixel is described by x and y coordinates in the array of the image with the origin in the upper left corner. The value of the x coordinates increase from left to right and the value of the y coordinates increase from top to bottom. First, the feature extractor identifies line segments in each row of the image. Next, the feature extractor groups adjacent line segments together that form individual patterns or "features" of the image.

FIG. 7 is a flow chart that illustrates an embodiment of this method for extracting features from an array of pixels. The method begins at block 300. The method reads the value of each pixel in the image on a row-by-row basis to identify the line segments. At block 302, the method identifies the lines segments in a row of the image. A line segment is a series of contiguous pixels in a row that are all "set," e.g., correspond to a black pixel in a black and white image. At block 304, the method stores the x coordinates for each end of the line segment in arrays according to the row to which the line segment belongs. At block 306, the method determines whether additional rows need to be checked for line segments. If there are more rows, the method returns to block 302 and sequentially processes the rows. If there are no more rows, the method is complete in identifying line segments and proceeds to block 308 to begin the process of grouping line segments to produce features.

The process of identifying line segments is the only time that all of the pixels of the image are processed together.

Subsequently, the arrays created here are used to group line segments to identify the location of the patterns. Thus, the amount of data to be processed is reduced from millions of bytes to potentially only a few thousand bytes, depending on the size and complexity of the image involved. This advantageously reduces the processing time required to identify the location of patterns in the image.

At block 308, the method begins the grouping process by selecting an unprocessed line segment. At block 310, the method determines whether line segments in the rows above and below the unprocessed line segment are adjacent to the unprocessed line segment. A line segment is adjacent to the unprocessed line segment if the line segment has a least one pixel with an x coordinate that is greater than or equal to the x coordinate of the start pixel of the unprocessed line segment and one pixel with an x coordinate that is less than or equal to the x coordinate of the end pixel of the unprocessed line segment.

If there are line segments that are adjacent to the unprocessed line segment, these line segments are placed on an inline stack at block 312. At block 314, the method determines the maximum and minimum x and y coordinates for the current group of line segments. During each pass through the loop, the method updates these values at block 314 so as to determine the vertices of the feature. These values are recorded at block 322 for each feature.

At block 316, the method marks the current line segment as processed and pops the next line segment off the inline stack at block 318. The method returns to block 310 to process this next line segment in the feature.

When the method determines at block 310 that there are no adjacent line segments, the method proceeds to block 319 and marks the line segment as processed. At block 320, the method determines whether more unprocessed line segments are on the stack. If there are more line segments on the stack, the method proceeds to block 318 and begins to process the next line segment in the feature.

When the method determines at block 320 that there are no more line segments on the stack, the method proceeds to block 322 and records the x and y coordinates for the vertices of the extracted feature.

At block 324, the method determines whether there are more unprocessed line segments. If there are more unprocessed line segments, the method returns to block 308 to begin the process of extracting another feature. If there are no more unprocessed line segments, the method ends at block 326. The method produces a linked list of the coordinates of all of the features in the image. This linked list is subject to change in later processing by a pattern recognition system. For example, as described more fully below, a validation module can be used to combine adjacent patterns into a single feature when the individual features are unrecognizable. If the combined features produce a feature that is recognizable, the linked list of features is updated. Advantageously, the pattern recognition system becomes more effective by allowing the system to adjust the coordinates of the features as features are processed and thus correct errors in the initial feature extraction.

Once a feature is extracted, a numerical representation of the pattern or feature is created. Typically, this numerical representation consists of a vector of binary numbers. The numerical representation has fewer bits than the number of pixels in the pattern. This allows faster processing.

In one embodiment of the present invention, a vector generator is provided that is invariant to the size of the extracted features. Advantageously, a vector generator that is size invariant allows a pattern recognition system to work with images from scanners of various resolutions using a single vector generator.

Figure 4:
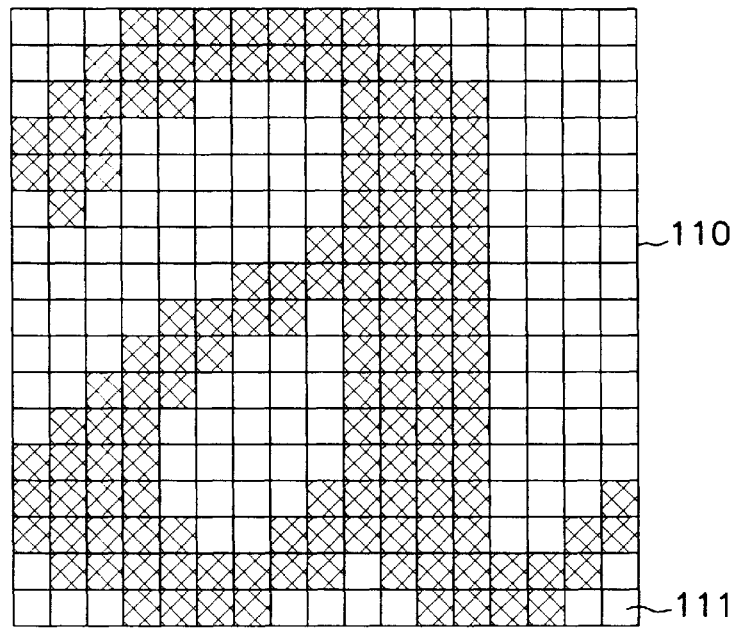
FIG. 4 is a graph that shows a pixel representation of a character.
Figure 6:
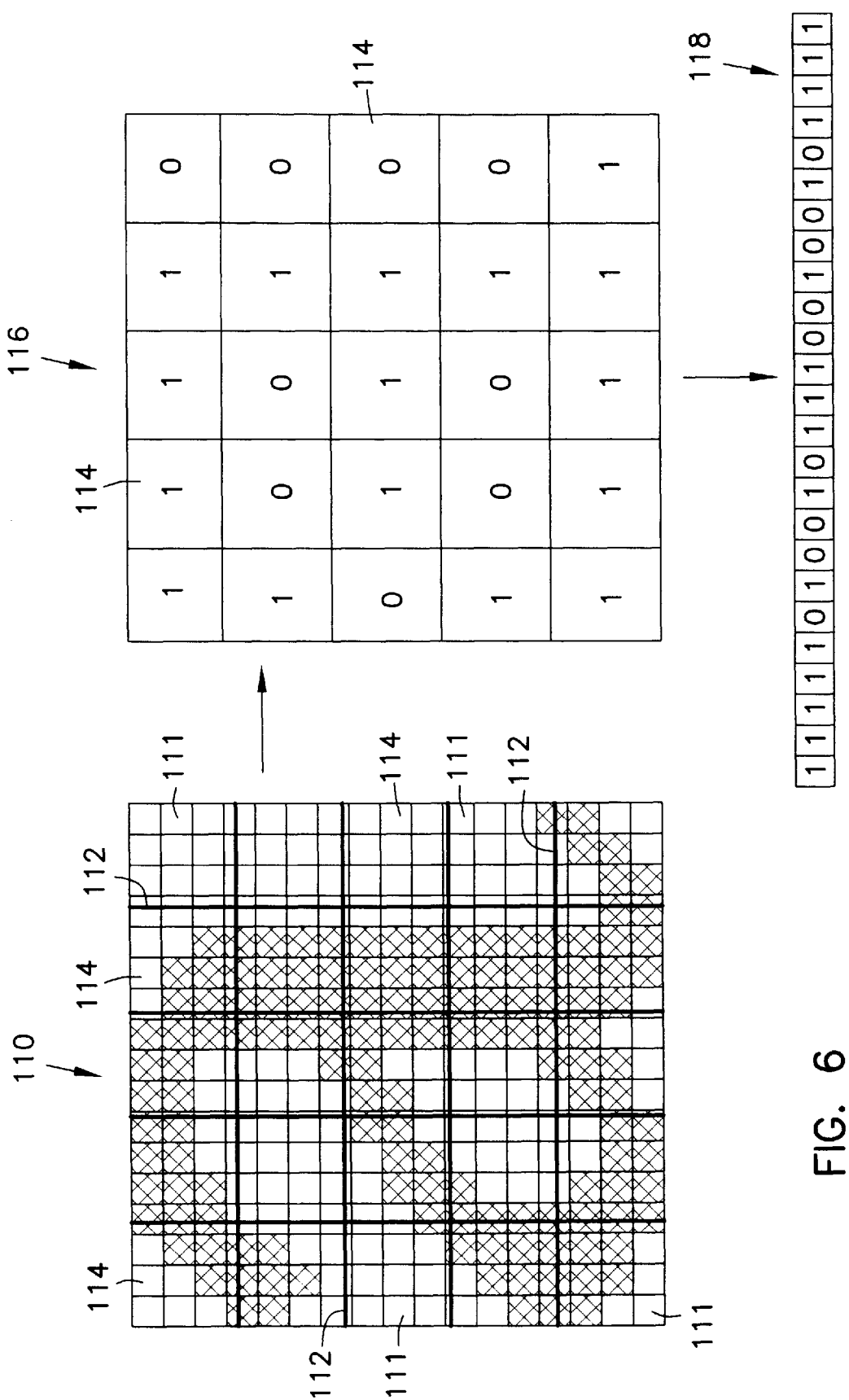
FIG. 6 is a data flow diagram that illustrates a method for generating a numerical representation of a character.
Figure 8:
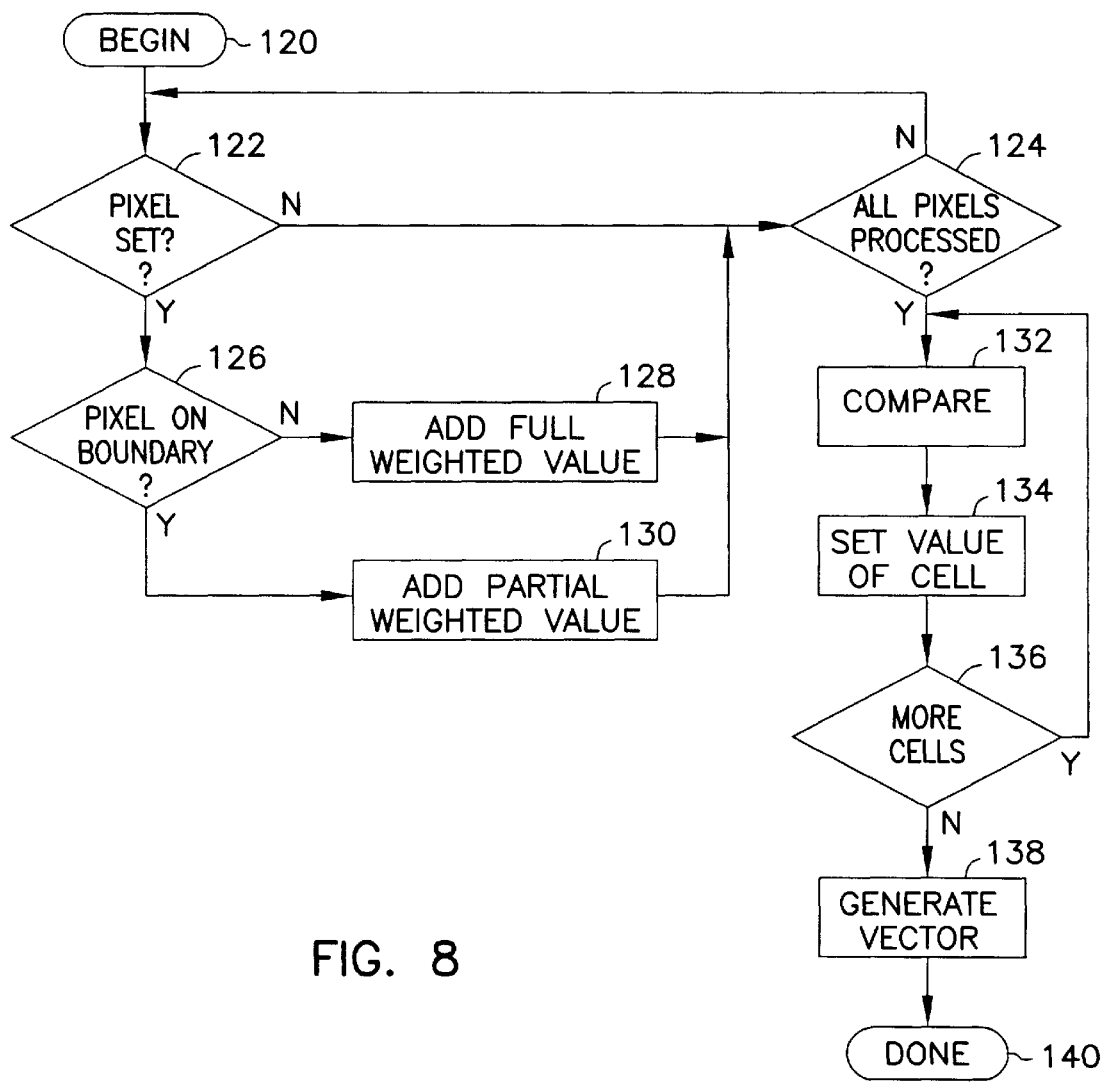
FIG. 8 is a flow chart that illustrates a method for generating a vector representation of an extracted feature.

FIGS. 4, 6 and 8 depict a method for generating a numerical representation of an extracted feature according to the teachings of the present invention. FIG. 4 is a diagram that shows a pixel representation of feature 110 comprising the letter "a" that has been extracted from a larger image. In this case, feature 110 is a 17×17 matrix of pixels 111. FIG. 6 is a representational diagram that illustrates conceptually the process of generating a numerical representation of extracted feature 110. Extracted feature 110 is divided into an n-by-m matrix 116 of cells 114 designated by lines 112 in FIG. 6. In this illustration, matrix 116 is shown as being a 5-by-5 matrix. However, it is understood that the size of the matrix can be varied. In fact, as described in more detail below, at least some of the images used in building and implementing the classifier will be converted to numerical representations using different sized matrices. This can help in resolving conflicts when identical numerical representations are generated for sample patterns of different pattern types using the same size matrix.

A binary value is assigned to each cell 114 by comparing the number of set pixels in the cell with the average number of set pixels per cell for extracted feature 110. If a cell has an above average number of set pixels, the cell is set to a binary "1," otherwise, the cell is set to a binary "0." The values for cells 114 are shown in matrix 116 in FIG. 6. Matrix 116 is converted to a vector by or-ing and shifting the values in matrix 116 to produce vector 118 that represents extracted feature 110.

As with the situation depicted in FIG. 6, the boundaries of cells 114 typically do not coincide with pixel boundaries. This complicates the process of assigning a binary number to a cell of matrix 116. FIG. 8 is a flow chart of a method that accounts for non-alignment of cell and pixel boundaries. The method begins at block 120. At block 122, the method receives the value of a pixel and determines if the pixel is set as defined above. If the pixel is not set, the method proceeds to block 124 and determines if all pixels have been processed. If all pixels have been not been processed, the method returns to block 122 and retrieves the next pixel.

If at block 122, the method determines that the pixel is set, the method proceeds to block 126 and determines whether the pixel is on a boundary between two or more adjacent cells 114. This can be accomplished by a look-up table that indicates which pixels are on the boundaries. Such look up tables are generated prior to processing extracted features. If the pixel is not on a boundary, the method proceeds to block 128 and adds a value to a counter for the cell that indicates that the pixel is set. For ease of calculation, the value added for a non-boundary pixel is equal to, for example, the number of rows multiplied by the number of columns in matrix 116. This weighted value allows fractional amounts to be added to the counter for a cell for pixels that are only partially in a cell without the need for complicated division which would slow down the process. Specifically, when at block 126 it is determined that the pixel is on the boundary between cells, a fractional amount of the full value is added to the counter for the cell at block 130. The fractional amount is determined, for example, based on the remainder when the number of rows or columns of the pixel representation is divided by the number of associated rows or columns of the matrix 116. For pixels that are on the boundary of a column, the fractional amount is equal to the number of columns times the remainder. For pixels that are on the boundary of a column, the fractional amount is equal to the number of rows times the remainder. These fractional amounts do not need to be calculated as a feature is processed. Rather, they may be calculated and stored prior to use of the method for ease of processing. The method proceeds from block 128 or 130 to block 124 to determine whether more pixels are still to be processed.

When block 124 determines that all pixels have been processed, the method proceeds to block 132 and compares the value of the counter for a cell 114 to the average value of the counters for all of the cells. At block 134, the cell is set to a binary "1" if the counter for the cell is above the average value for the counters. Otherwise, the value for the cell is set to a binary "0."

At block 136, the method determines whether more cells need to be processed. If more cells need to be processed, the method returns to block 132 and compares the value of the counter for the next cell with the average counter value. If, however, all of the cells have been processed, the method proceeds to block 138 and produces a vector from the values of cells 114 of matrix 116. The method is done at block 140.

It was noted above that the size of matrix 116 may be varied. According to one aspect of the present invention, the ability to vary the size of matrix 116 provides a basis for properly classifying a pattern when a numerical representation corresponds with more than one pattern-type. In this embodiment, more than one numerical representation is generated for some patterns. For example, patterns are converted to numerical representations with 4-by-4, 5-by-5 and 7-by-7 grids. When use of a 5-by-5 grid produces a number that corresponds to multiple pattern-types, the pattern is converted to a numerical representation using a 4-by-4 and/or a 7-by-7 grid. Because the different grids are relatively prime, the numerical representations created with the different grids should have only one pattern-type in common. This pattern-type would be selected for the pattern.

III. Applying the Classifier to Pattern Recognition

Figure 9:
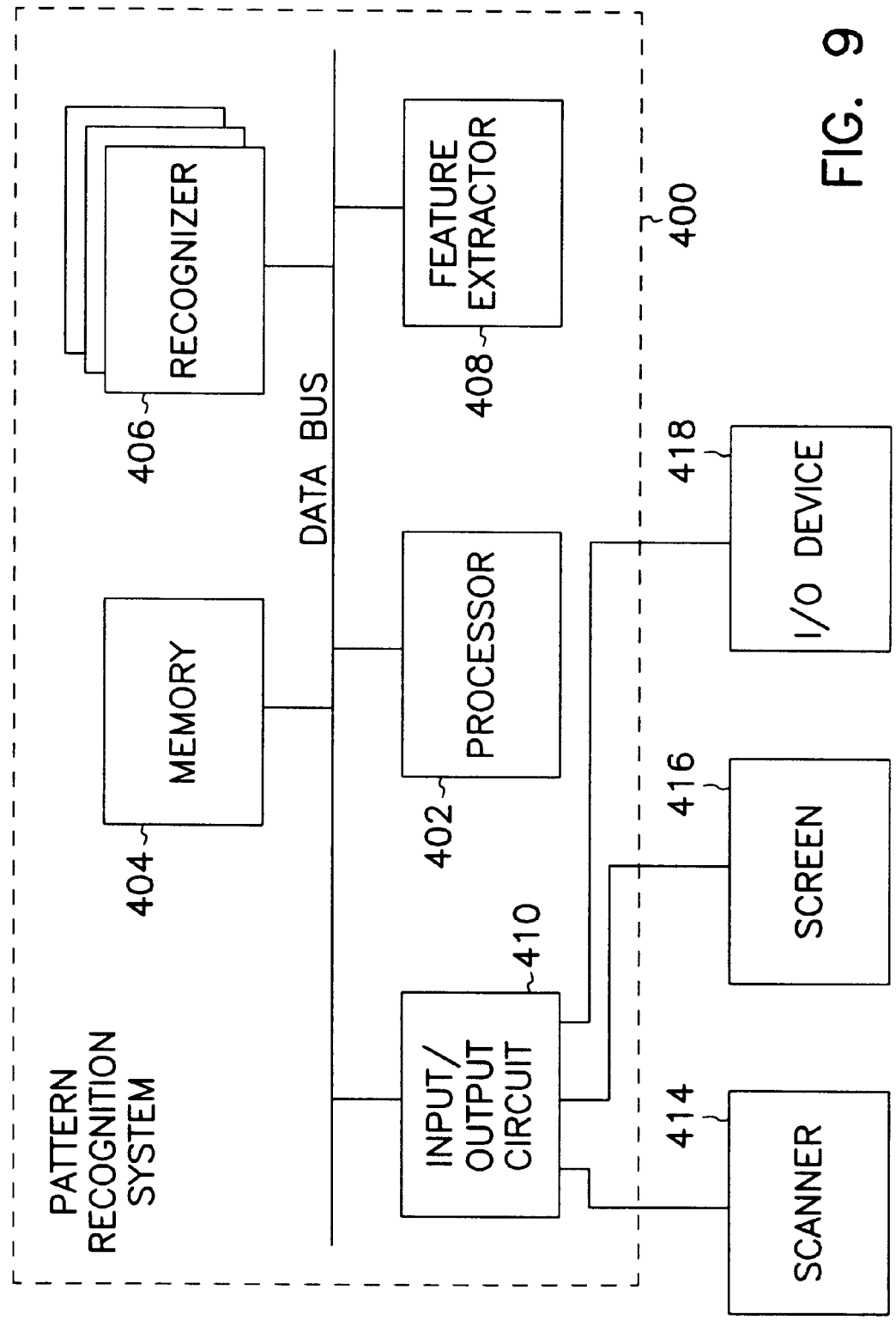
FIG. 9 is a block diagram of an illustrative embodiment of a pattern recognition system according to the teachings of the present invention.

FIG. 9 is a block diagram of an illustrative embodiment of a pattern recognition system, indicated generally at 400, that is constructed according to the teachings of the present invention. System 400 includes processor 402, memory 404, one or more recognizers 406, feature extractor 408, and input/output circuit 410. System 400 further includes data bus 412 that interconnects processor 402, memory 404, recognizer 406, feature extractor 408, and input/output circuit 410.

In operation, pattern recognition system 400 receives a digital image and classifies individual patterns of the image. Initially, input/output circuit 410 receives a TIFF image from, for example, scanner 414 and stores the image in memory 404. Other types of image files in other formats and from other sources could be used by system 400. Feature extractor 408 extracts individual patterns or features from the TIFF image using, for example, the feature extraction procedure described in detail above. This produces a data structure or file that identifies the location of each feature in the image. Also, as mentioned previously, this list of features is not static. Rather, the feature list can be updated as needed by system 400 to accurately identify the extracted features. Once the features are identified, the features are provided to recognizer 406. Recognizer 406 includes a classifier such as the Bayes-type classifier described above. Recognizer 406 generates a list of the candidate pattern-types for each extracted feature using the Bayes-type classifier. It is noted that in this embodiment processor 402 can control up to five recognizers 406. It is further noted that the functionality of feature extractor 408 can be incorporated into recognizer 406.

From the list of candidate characters, system 400 produces an output file that specifies the most likely pattern-type for each pattern in the image. Processor 402 selects the most likely candidate pattern-type using a number of "validation modules." These validation modules are typically software routines that use contextual information about the image being processed to select among multiple candidate pattern-types. For example, processor 402 can be programmed with a validation module that checks to see if the candidate pattern-types of a portion of the image combine to form a valid first name, last name, street address, etc. Other validation modules are identified in more detail below.

Advantageously, the validation modules used with a specific image are specified prior to processing the image but are not statically built into system 400. Rather, a user of system 400 can freely select from among the available validation modules for use with a specific image or processing of a number of images. By providing selectable validation modules, system 400 can be readily and easily modified for a specific job without requiring the user to have knowledge of extensive and complicated coding techniques.

Figures 10, 11:
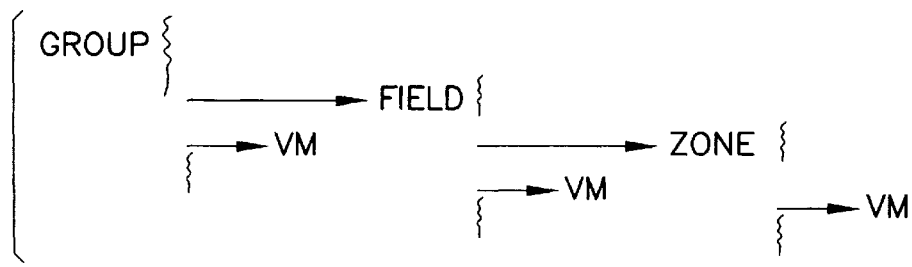
FIG. 10 is a diagram of an illustrative embodiment of an architecture for processing data produced by the system of FIG. 9.
FIG. 11 is a diagram of a representative document for processing by the system of FIG. 9 in the context of character recognition.

In one embodiment, system 400 of FIG. 9 is used for extracting data from a form that is filled in with hand-written or machine generated characters. System 400 produces a file with the data from the form in a machine readable format. To aid in this conversion process, system 400 allows a user to define a "data structure" for a specific form to be processed by system 400. The data structure identifies areas of the form that may contain data to be extracted by system 400 and other information about the form that can be used to validate the results of recognizer 406. FIG. 10 is a graphical representation of an embodiment of a data structure for use in this aspect of the present invention. In this embodiment, the data structure includes three levels of abstraction that are referred to as "groups," "fields" and "zones" and the data structure is referred to as a "GFZ" data structure. At the lowest level, the data structure includes zones which point to a number of validation modules (VM). At the next level of abstraction, fields point to one or more zones. Each field also points to one or more validation modules to be used in validating the data in the field. Finally, the highest level of abstraction is referred to as a "group." Each group points to one or more fields and associated validation modules. For pedagogical purposes, the interrelationship of these levels of abstraction are described in the context of a specific example.

FIG. 11 is a diagram of an exemplary form indicated generally at 500. The first step to create the GFZ structure is to define the "zones" of form 500. A zone is a bounded area on a form from which data is extracted by feature extractor 408. The feature(s) extracted from a zone is provided to recognizer 406 to identify candidate characters for the validation modules of processor 402. The zone is the lowest level of abstraction. A zone may contain a single character or multiple characters. For example, form 500 contains a series of nine boxes 502 for the Social Security Number (SSN) of the claimant. A user of system 400 can define each box 502 as a zone. Similarly, each of segments 504 for the last name, segments 506 for the first name and segment 508 for the middle initial (M.I.) can be defined as separate zones. By contrast, the box labeled "Description of Claim" 514, and lines labeled "street address" 510, and "State/City/Zip" 512 can be defined as zones that contain multiple characters. In fact, box 514 can be defined as a zone that contains multiple lines of text. It is noted that when a zone is sent to recognizer 406 there is often a degree of uncertainty in the output of recognizer 406. For example, the number "1", the lower case letter "l" and the capital letter "I" may have the same numerical representation.

The next level of abstraction in the GFZ data structure is a "field." A field is a relationship between one or more zones. For example, the zones for boxes 502 are interrelated into a social security number field 516. Similarly, segments 505, 506, and 508 can be combined to form last name field 518, first name field 520 and middle initial field 522, respectively. It is noted that a field can be coextensive with a zone as in the case of box 508 (zone) and middle initial field 522. Finally, street address zone 510 and "State/City/Zip" zone 512 combine to form address field 524. The validation modules used at the zone level often provide the information necessary to clear up conflicts in results at the zone level.

The last level of abstraction in the GFZ data structure is the "group." A group is a logical collection of fields. For example, fields 518, 520, and 522 combine to provide a "name" group 526.

The GFZ data structure is described in a file, called the Intermediate Feature Description (IFD) file or database, that uses pointers to indicate the interrelationships between the different levels of abstraction for the form. For example, a group data structure includes a number of pointers that identify the fields that make up the group. Further, the group data structure includes pointers that identify the validation modules selected for the group. Similarly, the field includes pointers directed to the selected validation modules and the zones which make up the field. Finally, each zone data structure includes pointers that indicate the validation modules for use with the zone. Further, the zone, field and group data structures include additional information that defines various aspects of these data structures. This data structure is captured in the IFD file. During operation of system 400, the validation modules for each zone, field and group are performed in the order they are presented in the IFD file.

Figure 16A:
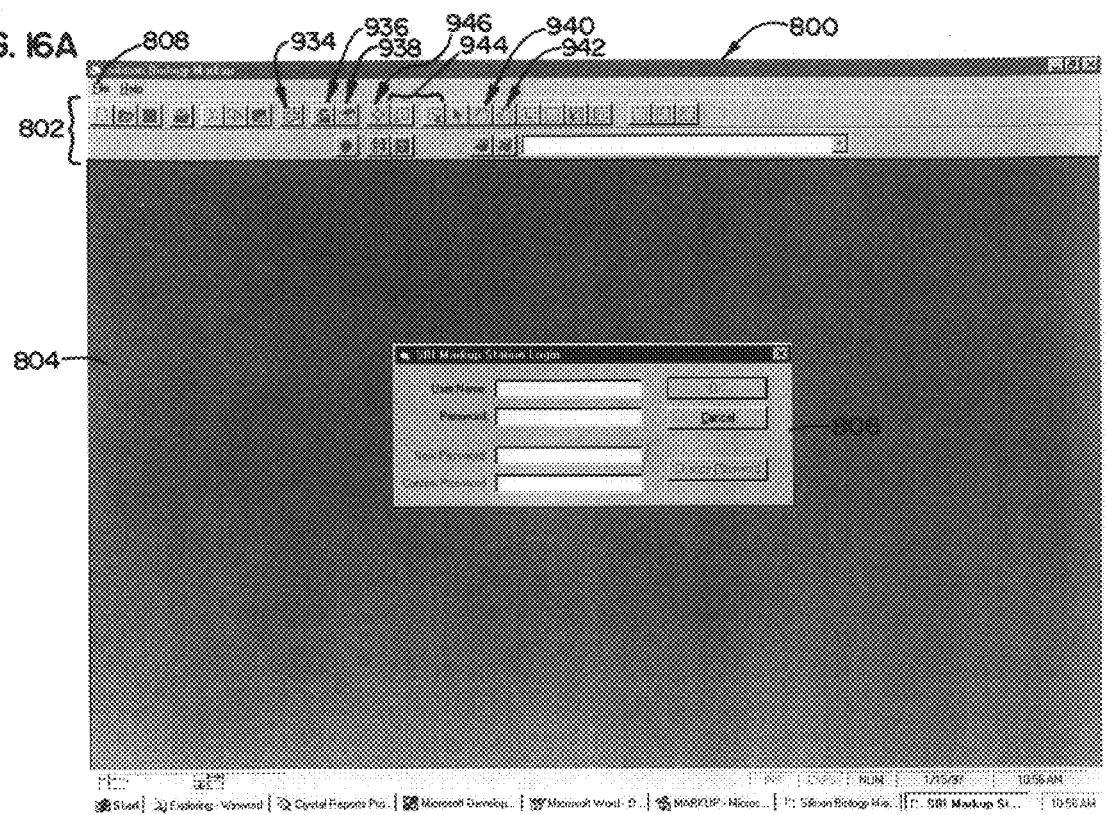
FIGS. 16A through 16R are printouts that illustrate the operation of a graphical user interface according to one aspect of one embodiment of the present invention.

In one embodiment, the present invention provides a system 400 with a graphical user interface for creating the IFD file for a particular form. Various windows used in the graphical user interface application are shown in FIGS. 16A through 16R. To create the IDF file, first one or more exemplary forms are converted to digital images and provided to system 400. The forms are displayed on screen 416 and a tool bar is provided with icons keys that are used to generate the IFD file from the form.

FIG. 16A is a graphical representation of an application window, indicated generally at 800, of the graphical user interface that is generated for display on screen 416 of system 400 or other appropriate computer system. Application window 800 is used to gather information about the forms to be processed in a job in order to create the IFD file or database. Application window 800 includes toolbar 802 that is displayed across the top of working area 804. In this embodiment, the application software includes a security feature. Specifically, prior to working with a form, a user must enter a name and password into login window 806 as shown in FIG. 16A. The operation of the icons of toolbar 802 are described herein with reference to FIGS. 16B through 16R, as necessary. To activate an icon to perform its intended function, the user moves a cursor over the desired icon of toolbar 802 and clicks a button on the mouse of I/O device 418 as is well known in the art.

First, a file is created or opened using the file menu. If the file has been worked on during a previous session, the file will be listed in open markup window 810 of FIG. 16M. As shown in FIG. 16M, open markup window 810 shows the names of files that have been saved previously and the relationship of the files. For example, file TEST2 was created from file TEST as indicated by the dashed, right-angle line connecting TEST2 and TEST. A file is opened by moving the cursor over the name of the desired file and selecting the file with the mouse of I/O device 418. The file is opened with button 812.

Once the file is open, the user selects a form from drop-down box as shown in FIG. 16I. The form is displayed in working window 804. With the form in place, the user marks-up the form to indicate the location of each zone to be processed by system 400. There are two basic types of zones that the user can create: registration zones and data zones. The registration zones are used with the registration validation modules described below to account for variations in scanning of the forms for a job. Essentially, the registration validation modules use the data created when a registration zone is defined to detect differences in the positioning of data zones on a form that is processed by system 400 as compared to the position of the same zone on the form used to create the IFD file. In this way, the registration modules account for variations in the scanning of forms for use by system 400.

Figure 16B:
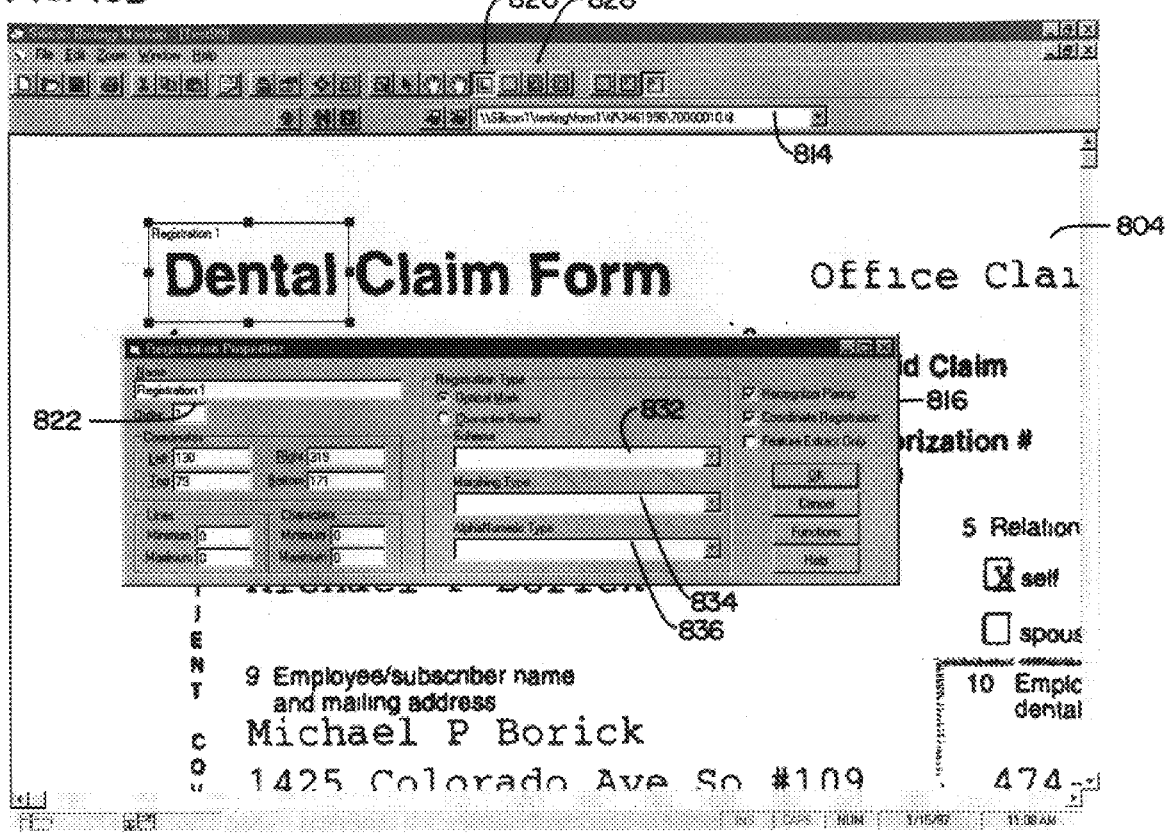
Figure 16C:
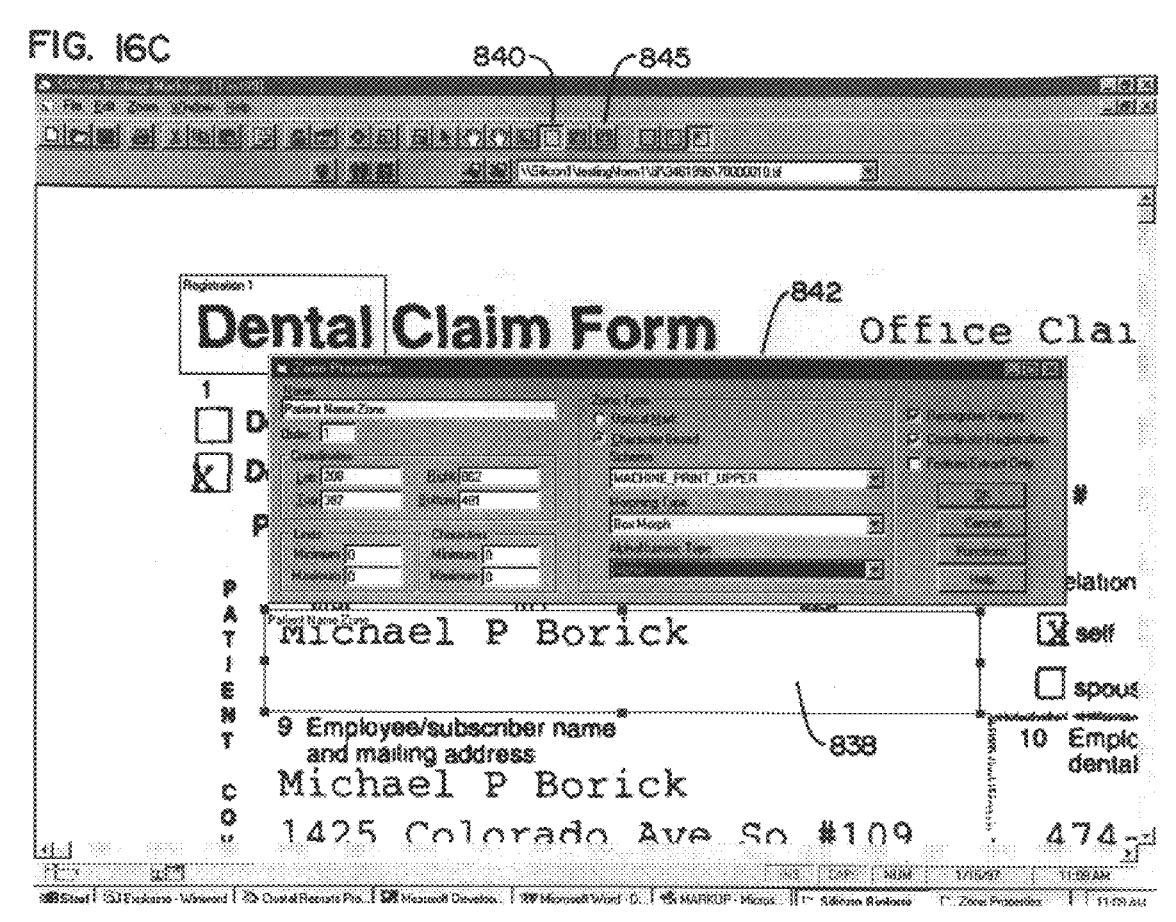

FIG. 16B is a graphical representation of a window, indicated at 816, used to define registration zone 818. To define an area of a form as a registration zone, a user depresses registration zone icon 820. Next, the user uses the mouse to define the vertices of registration box 818. The coordinates of these vertices are recorded and displayed in window 818. It is noted that in this embodiment, the application automatically names the registration zone "Registration #." The number sign indicates the order in which the registration zones were created and the order in which they will be executed. This order can be modified by changing the number in the order box 822 or by pulling up registration order window 824 using icon 826. In registration order window, the order of execution of the registration zones is changed by highlighting the name of a registration zone and then using move-up and move-down buttons 828 and 830, respectively.

Once the registration zone is identified, the user next defines what a registration module will do when it encounters the registration zone in a form processed by system 400 using the IFD file created by this application software. Specifically, the user can define the maximum and minimum number of lines of data to appear in the registration zone. A "0" indicates that the registration zone has an undetermined number of lines. Similarly, the maximum and minimum number of characters in a registration zone can be specified.

There are two types of registration zones that can be defined with this application software: optical mark and character based. If "optical mark" is selected, the validation module run on this registration zone will only look for some pattern in the zone of a form that is processed. If, however, "character based" is selected, the validation module will look for a specific character in the registration zone. When "character based" is chosen, the user will specify a classifier (in drop-down box 832). For example, the user could select a classifier that was created using the technique described above with only machine generated characters. Alternatively, the user could select a classifier that was created using hand-written characters or a combination or handwritten and machine generated characters. Drop-down box 834 defines how the features are extracted. Basically, "blob" morphing tells the recognizer to look for multiple features in a zone whereas "box" morphing tells the recognizer to expect a single feature. Finally, the user can indicate if the patterns in the registration zone will be alpha, numeric, or either alpha or numeric characters.

As shown in FIG. 16C data zones, such as patient name zone 838 are defined in a similar manner using data zone icon 840 and zone definition window 842. The order in which zones are processed by system 400 can be modified by using icon 845 and zone order window 844.

The graphical user interface further allows the user to define relationships among the defined zones. This produces the GFZ data structure described above. Specifically, the user begins the process of defining the GFZ data structure by selecting relationships icon 846. Relationships icon 846 pulls up relationships window 848. Zones that have been defined as described above, appear in box 850. To specify a field, the user depresses AddField button 851. The name of the new field appears in box 852. To specify a group, the user depresses AddGroup button 854. This allows the user to name the new group and the name appears in box 856.

Figure 16D:
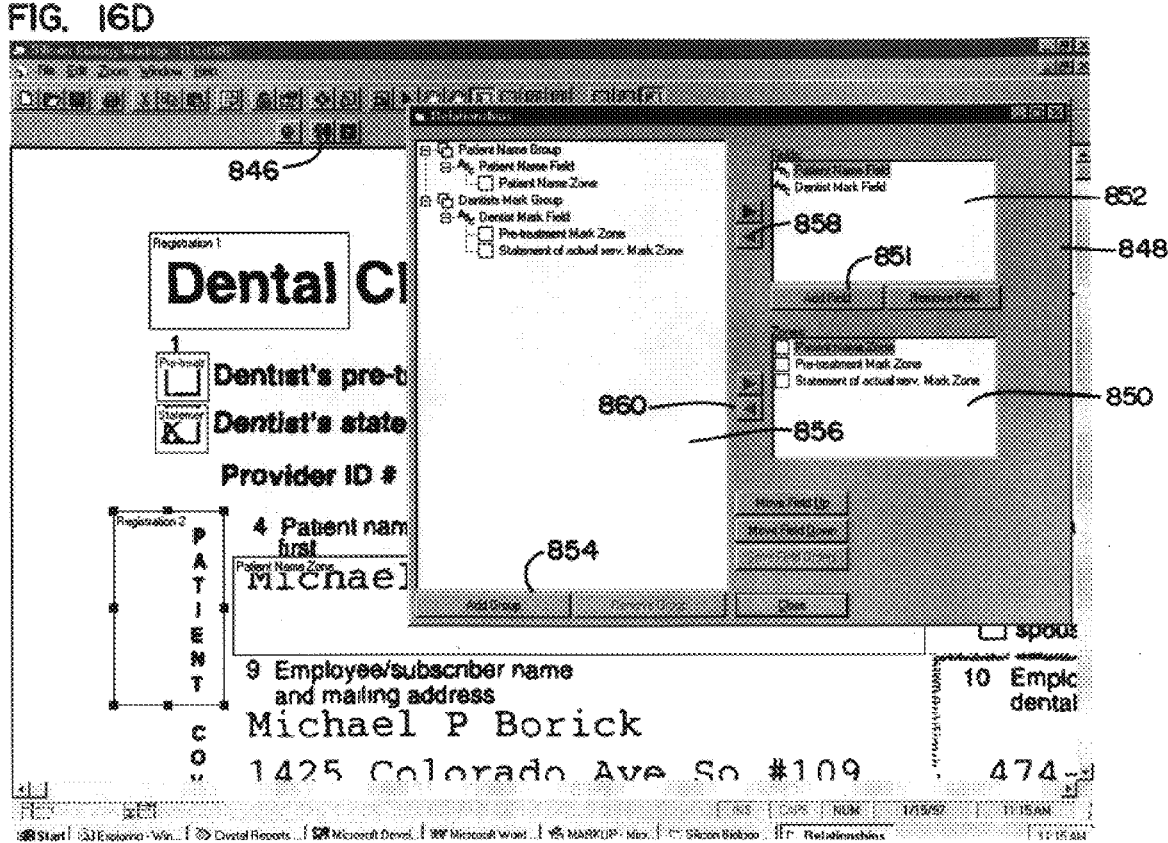
Figure 16E:
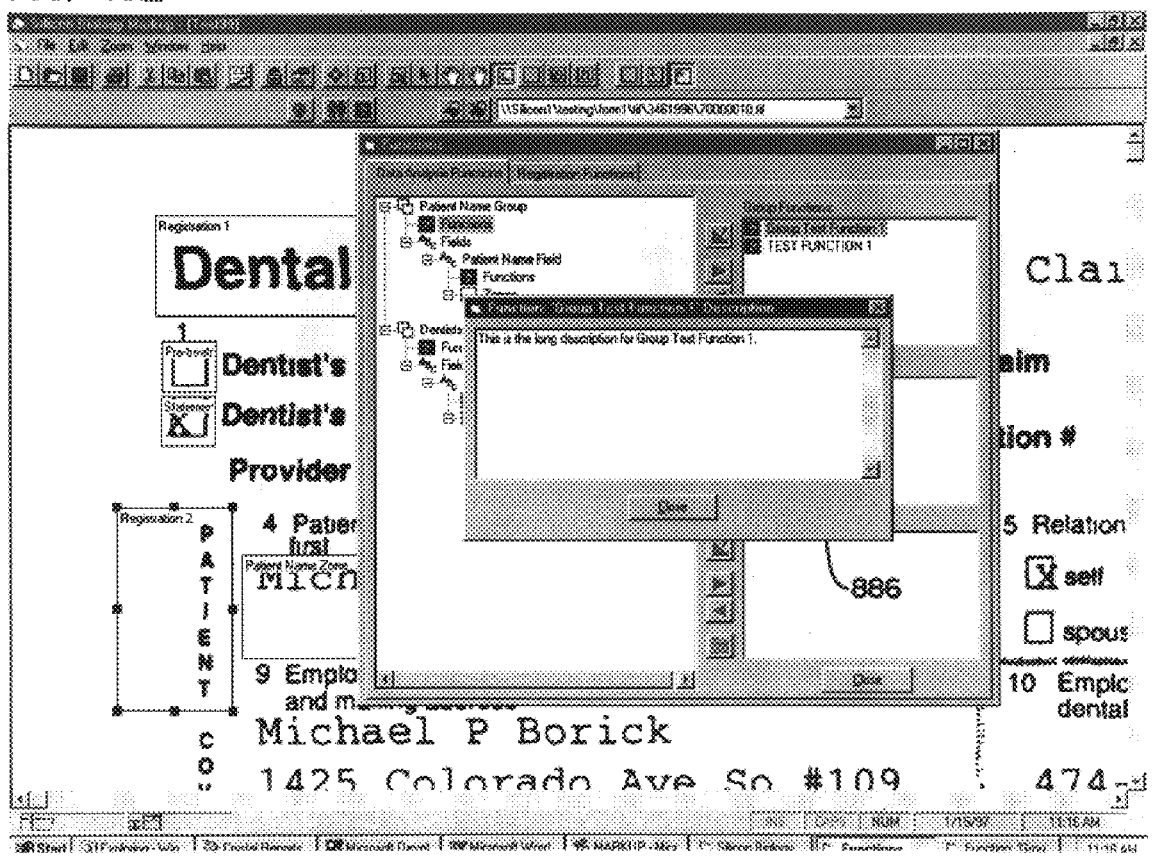

As described above, each group in the GFZ data structure is made up of a number of fields. To associate a field with a group, the user selects the group name in box 856 and selects the field name in box 852. The user then depresses button 858. This places the field name in box 856 below the selected group. For example, in FIG. 16D, Patient Name Field is shown below Patient Name Group. Similarly, zones are associated with fields using button 860. Window 848 also provides icons that allow a user to undo each step in the process of defining a GFZ data structure.

Figure 16G:
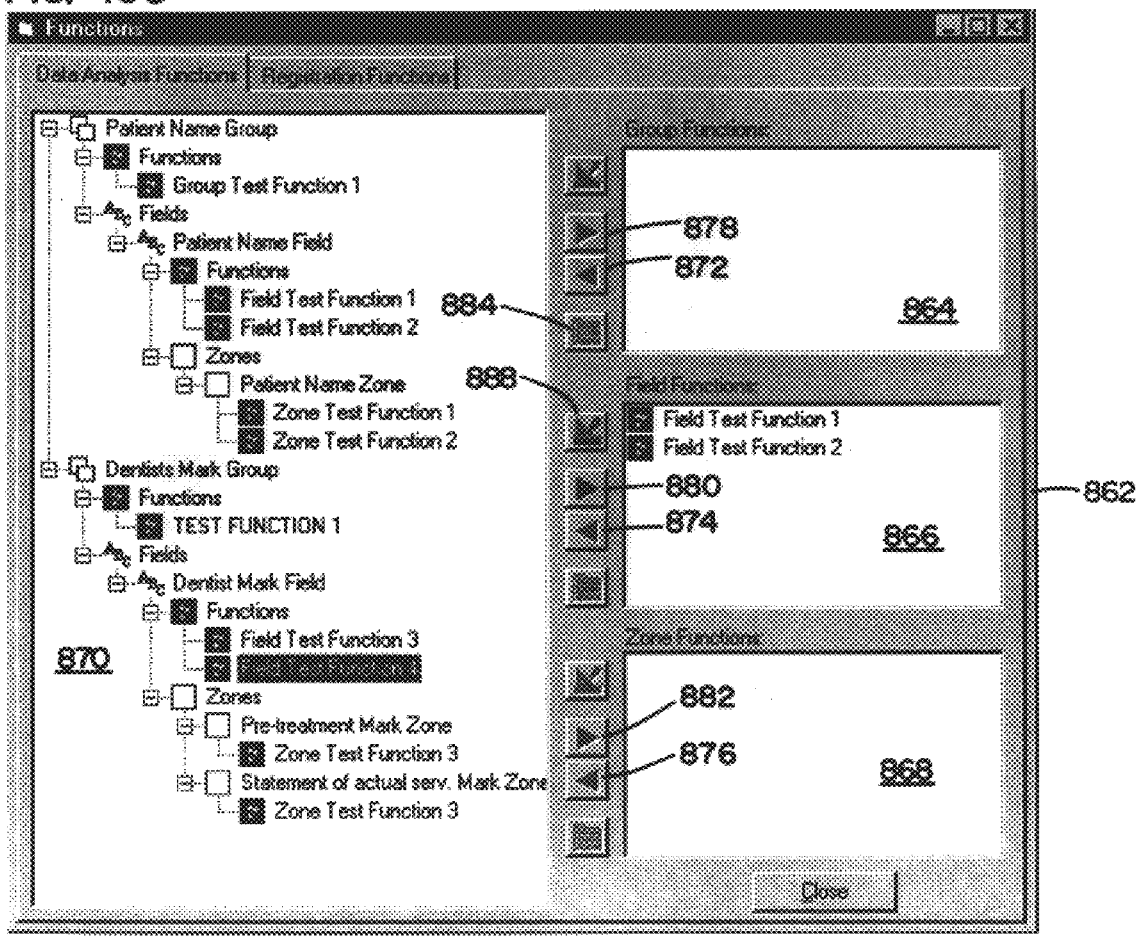

FIG. 16G is a graphical representation of an embodiment of a window, indicated at 862, that is used to define the validation modules or functions that are used with each zone, field and group of a data structure. Boxes 864, 866, and 868 contain the names of each of the functions or validation modules that can be used at the group, field and zone levels of the data structure, respectively.

Figure 16H:
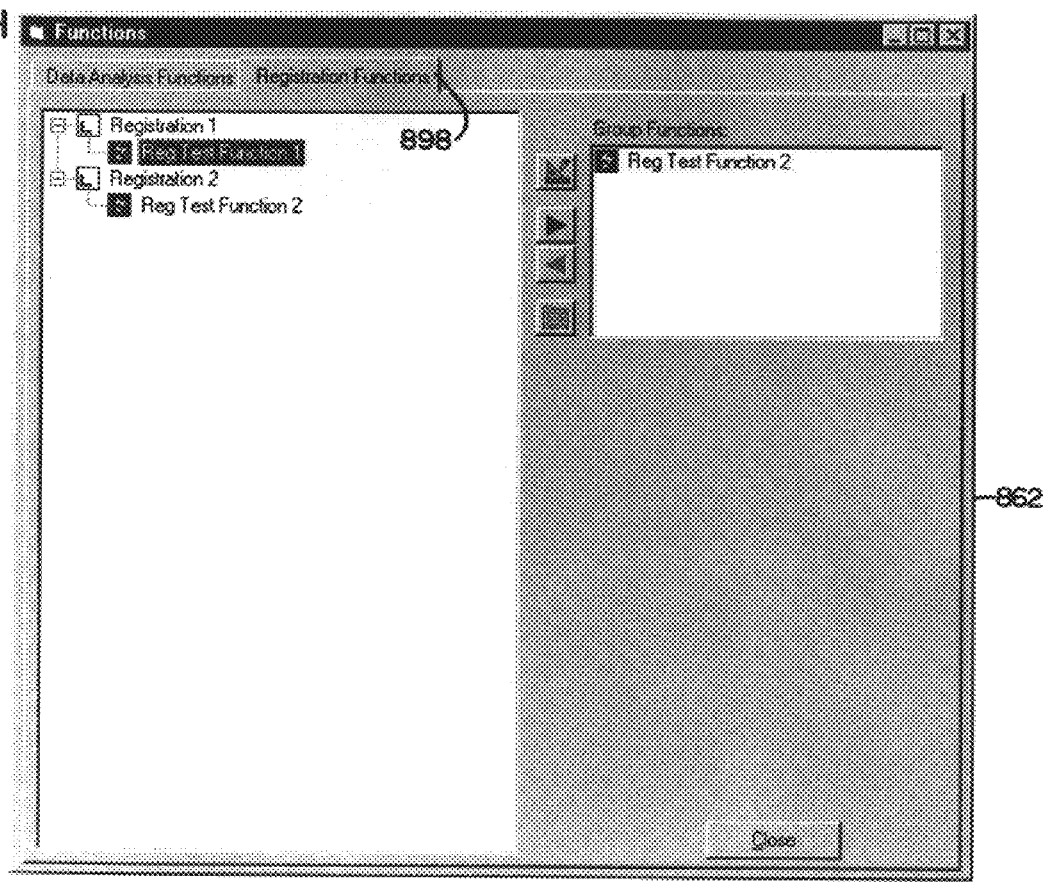
Figure 16I:
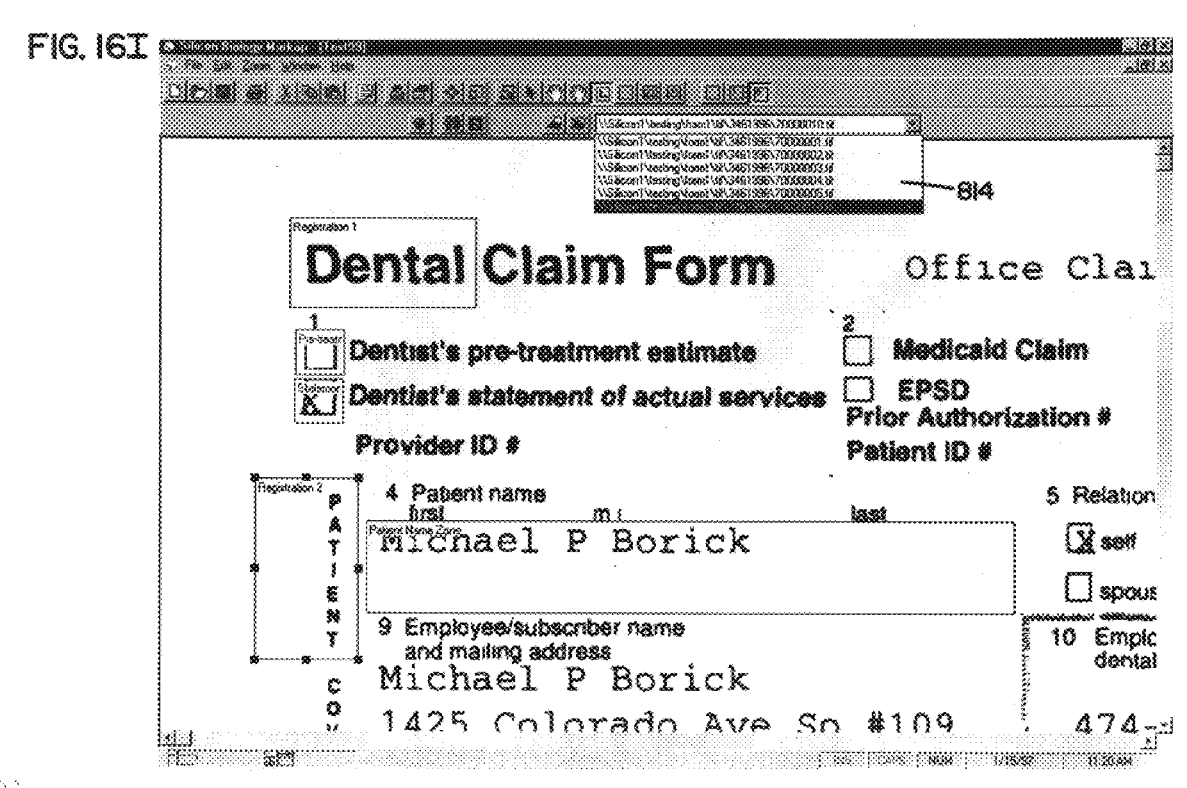
Figure 16J:
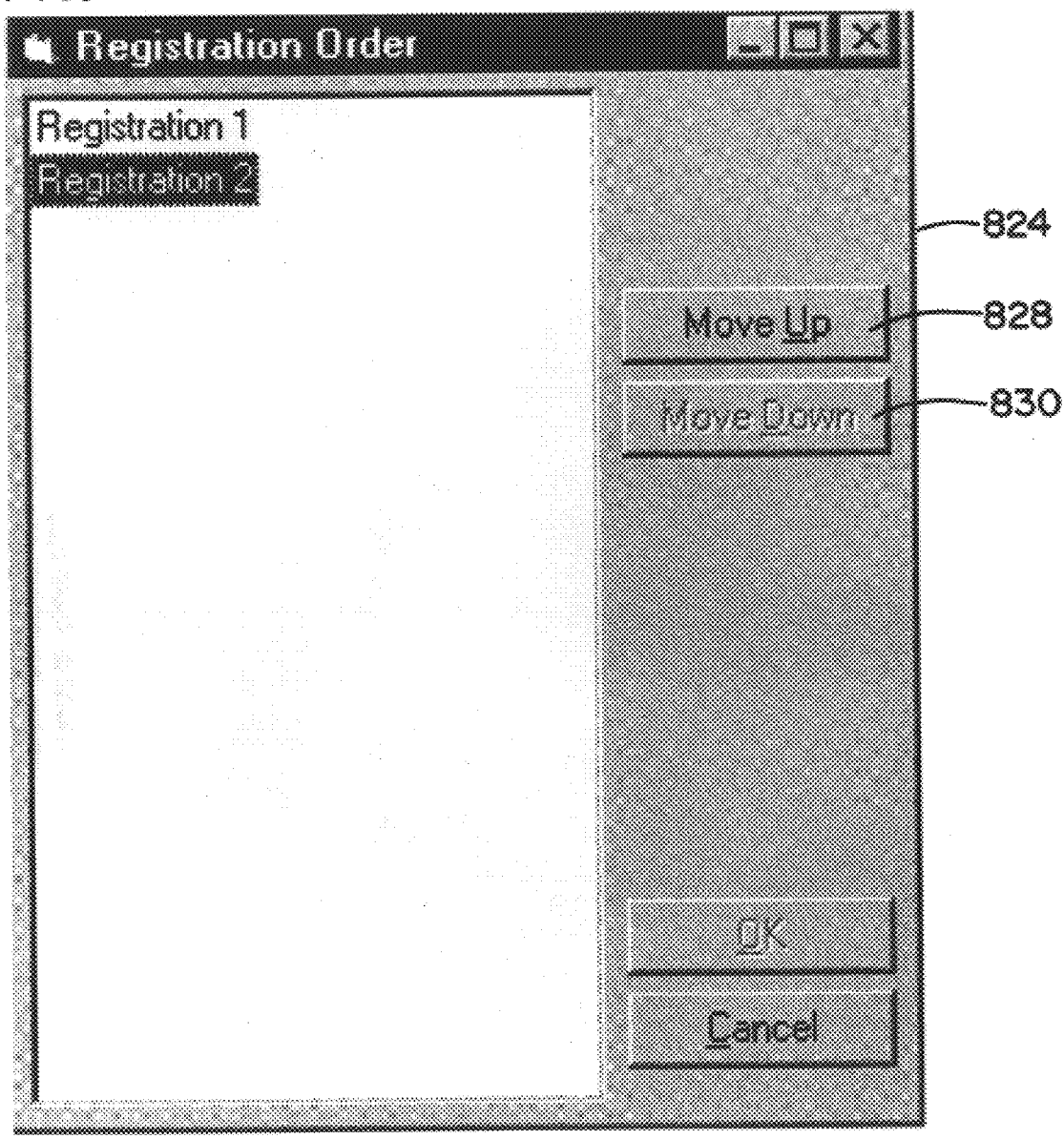
Figure 16K:
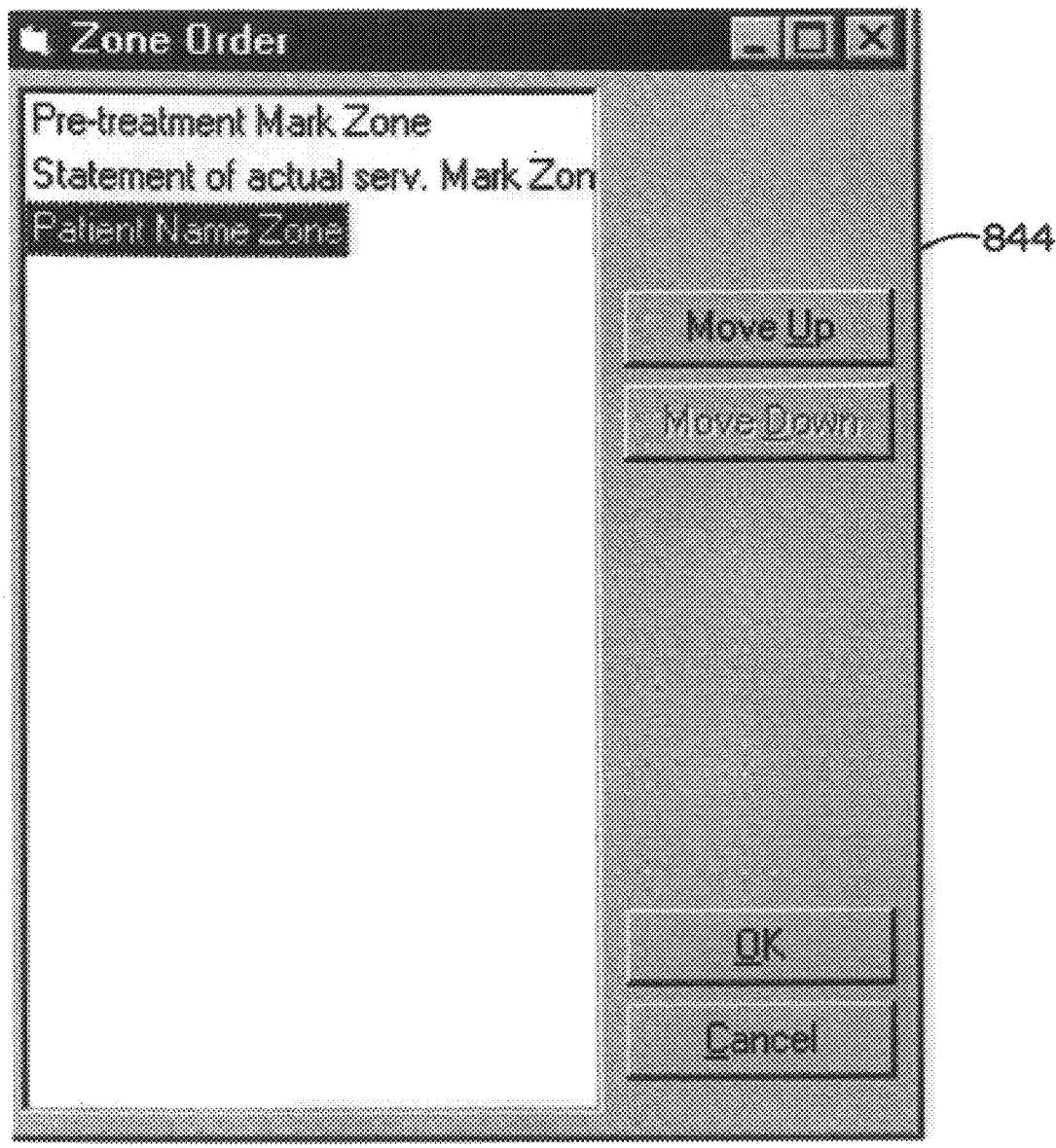
Figure 16L:
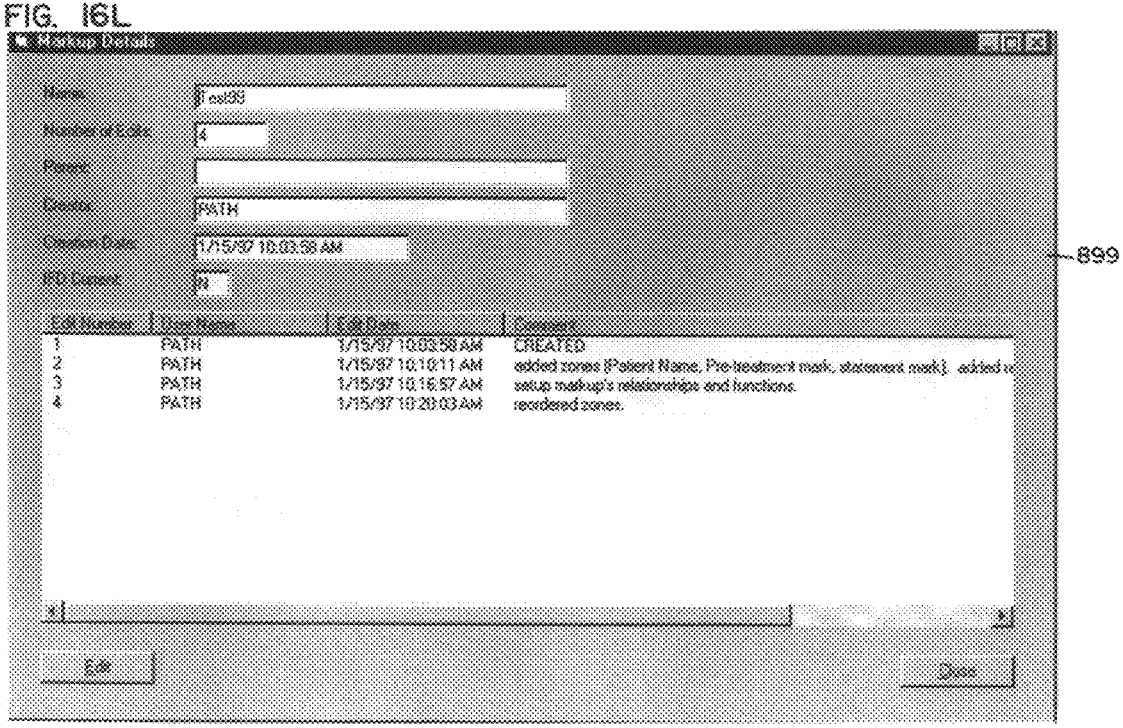
Figure 16M:
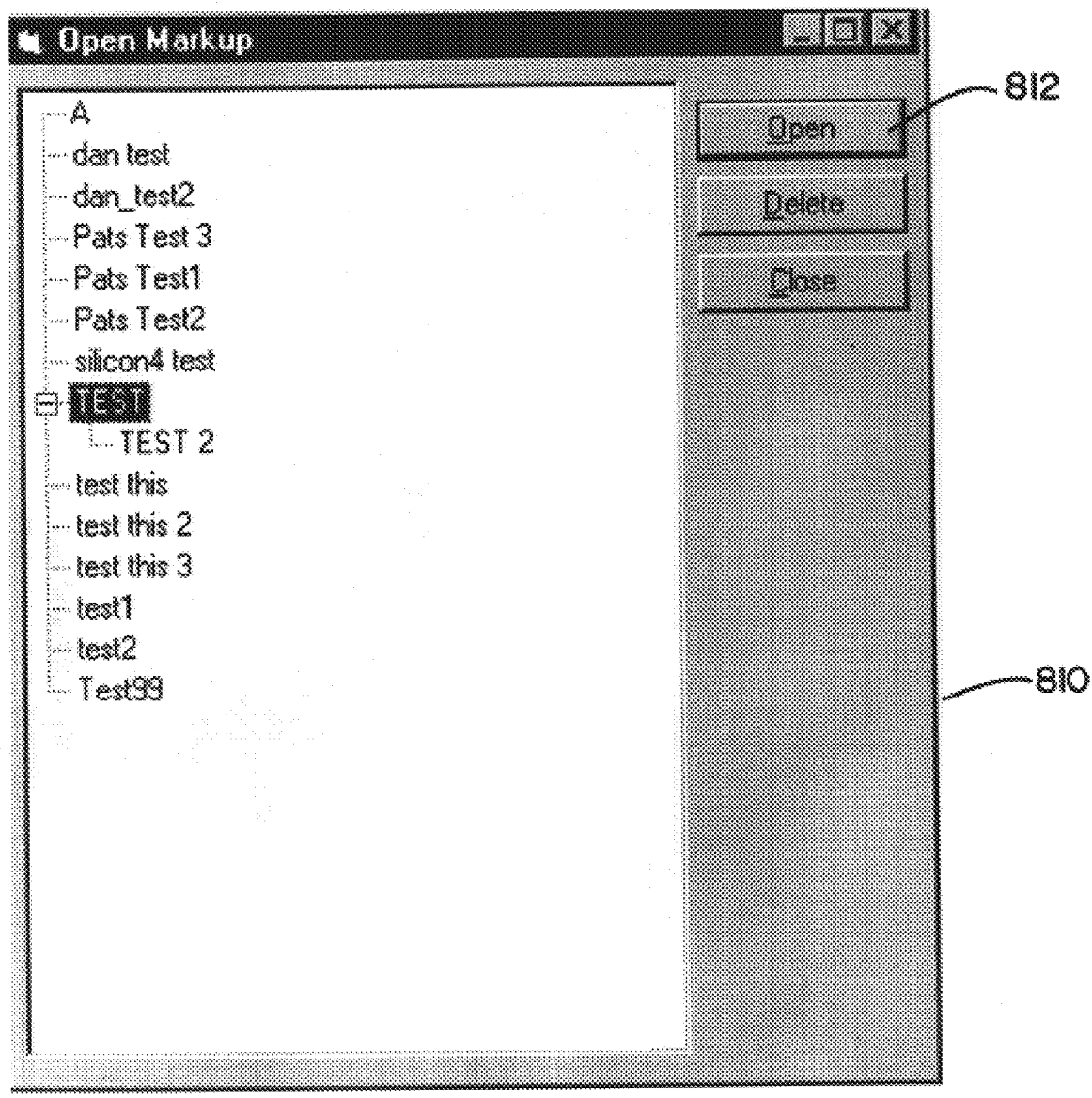

To select a function, the user selects the function in the appropriate box 864, 866, or 868 and selects the group, field or zone to which it applies in box 870. Icons 872, 874, and 876 are used to add functions to groups, fields, and zones, respectively. Similarly, icons 878, 880, and 882 are used to removed selected functions from groups, fields and zones, respectively, in window 870. Window 862 also provides assistance to the user in selecting the appropriate functions. For example, the user can use icon 884 to pull up a description of a function for at the group level as shown in window 886 of FIG. 16E. Similar icons are available at the field and zone levels. Further, the user can set parameter values for a function by selecting, for example, icon 888 at the field level. This pulls up window 890 as shown in FIG. 16F. Back and Next buttons 892 and 894 allow the user to move among the various parameters needed for a specific function. Save button 896 captures all of the data entered for the parameters for the function. Tab 898 toggles window 862 between functions for data zones and functions for registration zones. As shown in FIG. 16H, the user selects functions for registration zones in the same manner as described above for functions for data zones. Window 899 allows a user to record information each time a mark-up is edited.

Toolbar 802 includes additional icons for use with marking-up a form to create an IFD file. For example, icon 934 is used to generate the IFD file once the mark-up process is complete. Icon 936 is used to lock the coordinates of the zones in place. Icon 938 displays the properties of a selected zone, e.g., icon 938 pulls up window 816 or 842 for the selected zone. Icons 940 and 942 are used to pan the image. Icon 940 moves the entire image, including identified zones, whereas icon 942 moves the image only and leaves the zones where they are on the screen. Icons 944 control the zoom and icon 946 resizes a box.

Figure 16N:
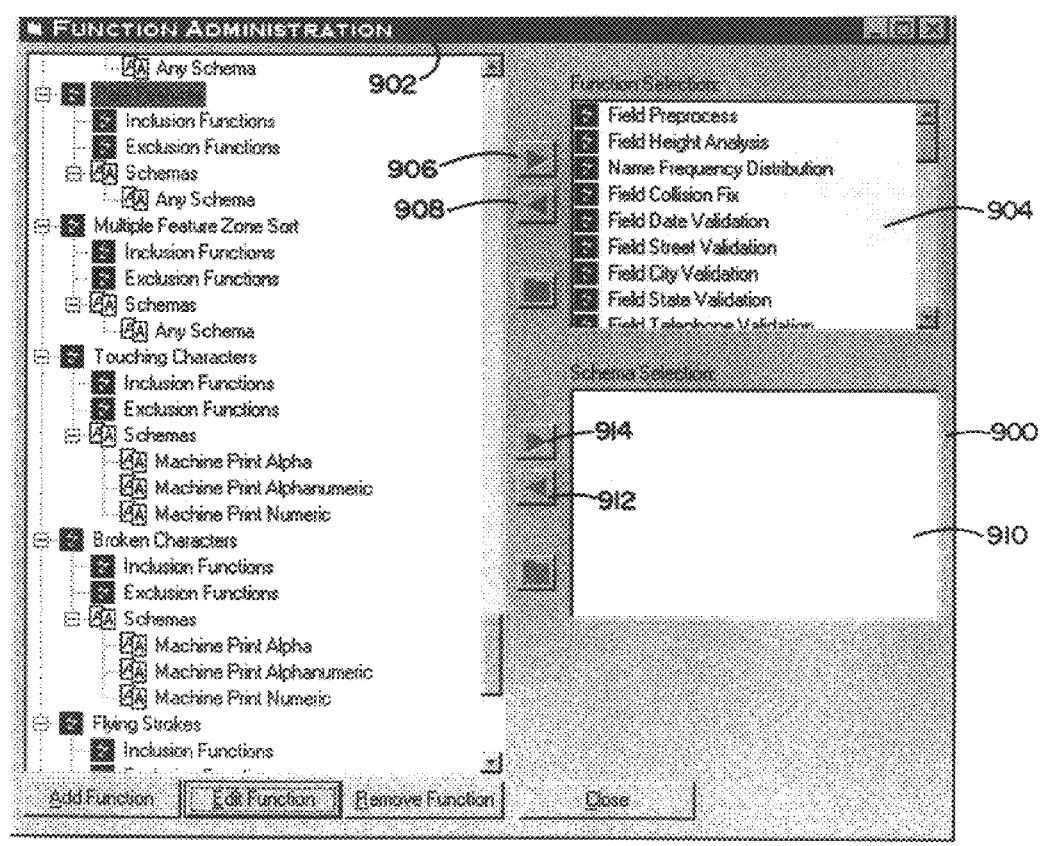

Prior to use by a user, the functions available on a system 400 are defined using the graphical user interface. Specifically, function administration window 900 is used to define the functions available to the user. As shown in FIG. 16N, box 902 contains a list of all of the available functions. Further, for each function, box 902 indicates the functions that are necessary for use with the specified functions (identified as the "inclusion functions") and the functions that cannot be used with the function (identified as the "exclusion functions"). Functions listed in box 904 can be added to or deleted from the "inclusion functions" and "exclusion functions" categories for a specific function in box 902 using buttons 906 and 908. Further, box 902 indicates which schemas or classifiers can be used with each function. For example, the function Pare Features can be used with any schema or classifier whereas the function Touching Characters can only be used with specified classifiers that were built for use with machine print. Schemas or classifiers are listed in box 910 and can be added to or deleted from box 902 using buttons 912 and 914, respectfully.

Figure 16O:
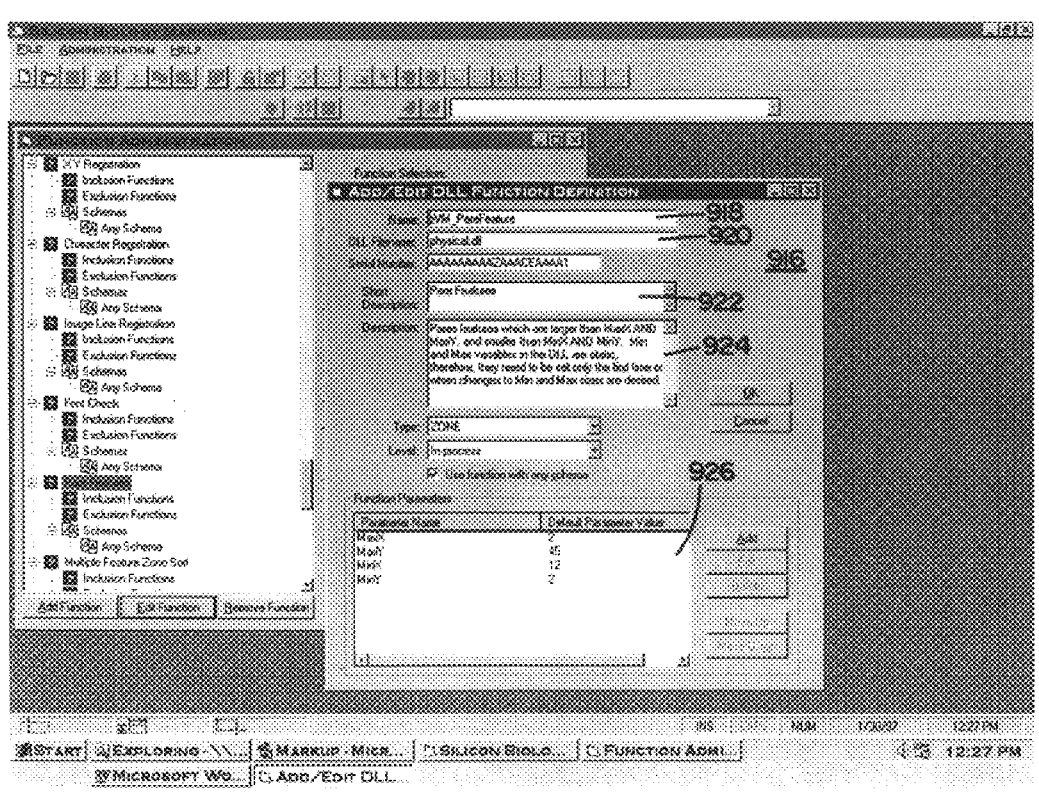
Figure 16P:
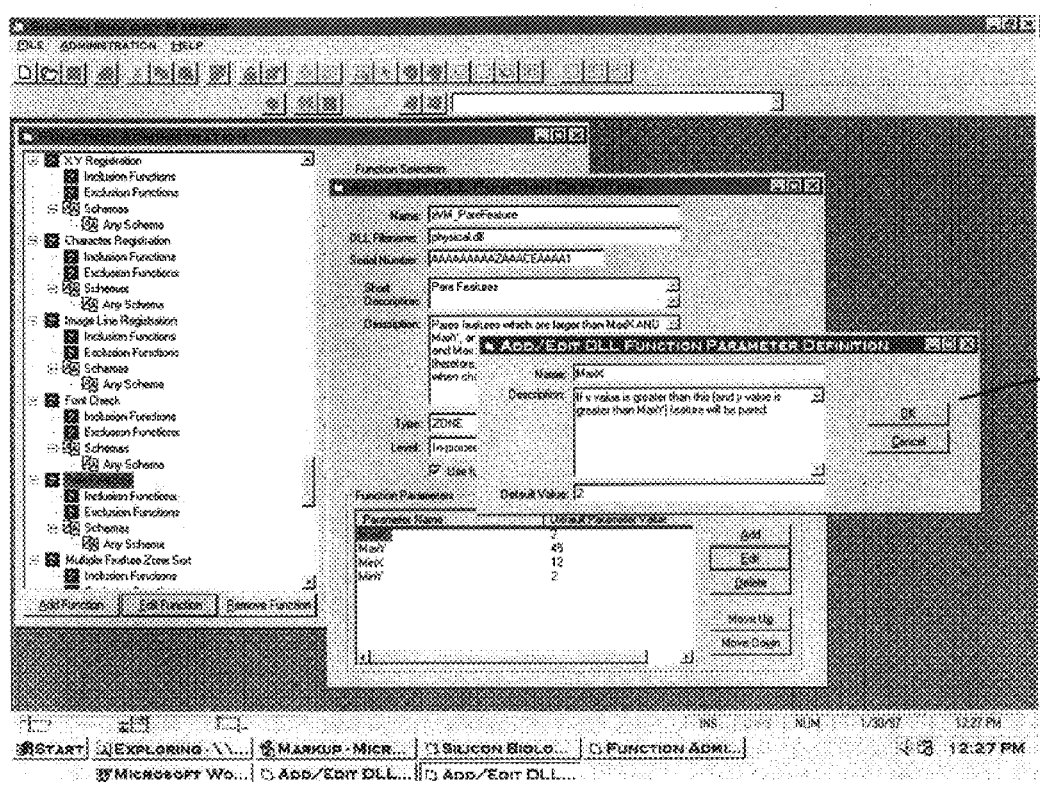
Figure 16Q:
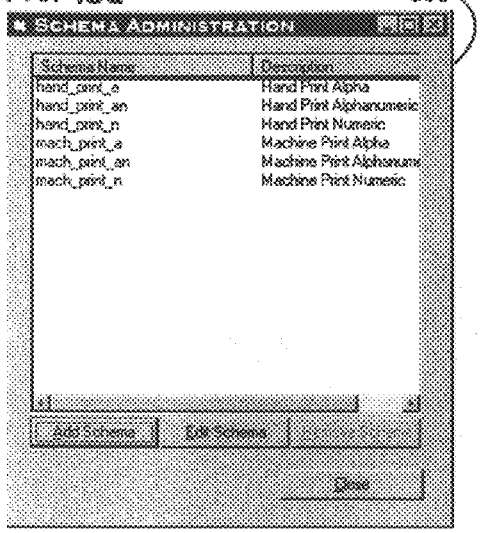
Figure 16R:
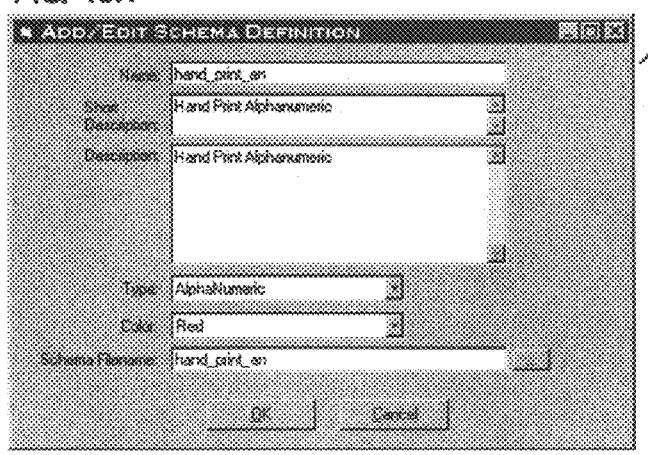

Window 916 of FIG. 16O gathers information to define a function. Specifically, name and DLL filename boxes 918 and 920 give the location of the executable code for the function. Boxes 922 and 924 give the name and description of the feature as presented to the user in windows 886 and 862. Further, window 916 includes box 926 which defines the parameters used with the function. When a parameter needs to be added or changed, window 928 of FIG. 16P is used. This allows the name, description and default for the parameter to be defined. Similarly, windows 930 and 932 of FIGS. 16Q and 16R are used to define which schemas can be used with system 400.

Figure 17:
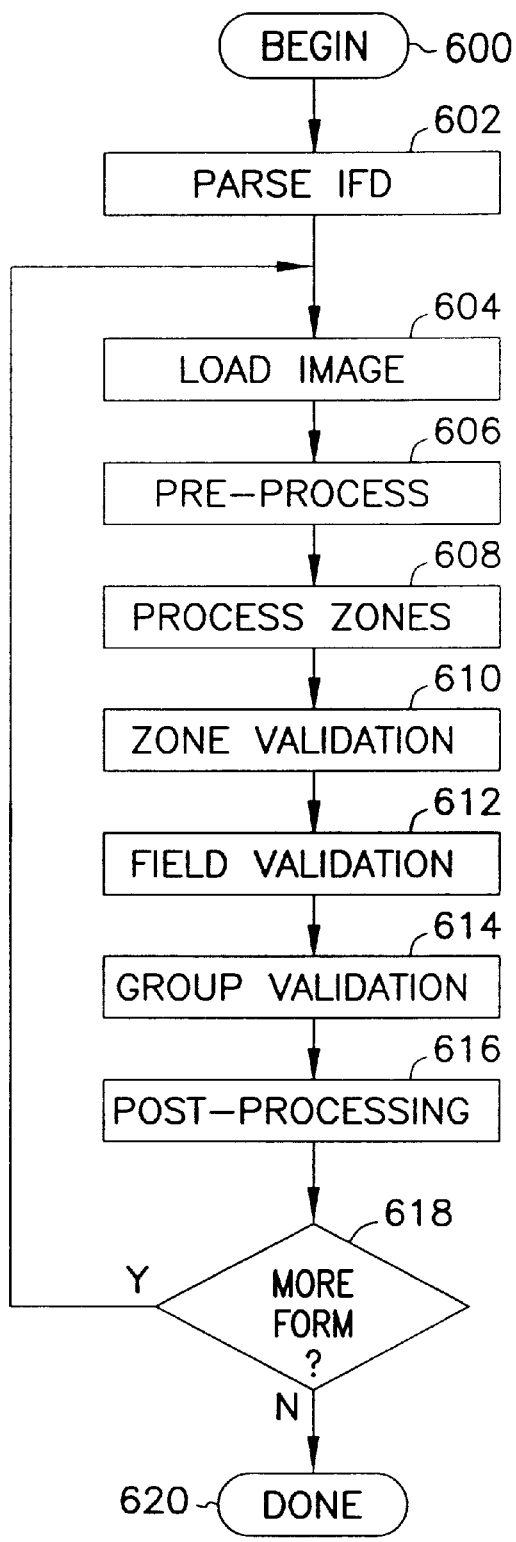
FIG. 17 is a flow chart that illustrates an embodiment of a process for using a classifier and validation modules in a pattern recognition system according to the teachings of the present invention.

FIG. 17 is a flow chart that illustrates an embodiment of a method for processing forms by system 400 of FIG. 9. In this embodiment, system 400 extracts data from a large number of forms. The forms are provided to system 400 and processed in groups referred to herein as a "job." The method begins at block 600. At block 602, processor 402 parses an IFD file for a job to be processed. This creates a GFZ data structure, including validation module lists for the group, field and zone levels in the job. At block 604 processor 402 loads an image to be processed into memory 404. This image is typically in the form of a TIFF file although other appropriate file formats can be used. At block 606, processor 402 runs "pre-processing" functions for the job as specified by the IFD file. For example, processor 402 can send commands to recognizer 406 and feature extractor 408 to run a registration validation module as described below. At the end of the specified pre-processing functions, recognizer 406 returns data to processor 402 such as offsets calculated as part of a form registration function.

At block 608, processor 402 sends each zone to recognizer 406. Recognizer 406 returns a list of candidate pattern-types for each zone to processor 402.

Once each zone is processed initially at block 608, processor 402 begins the process of verifying the pattern-types provided by recognizer 406. First, processor 402 runs the validation modules identified in the IFD file for each zone. For some validation modules, as described below, processor 402 combines, modifies or creates new features and sends these features to recognizer 406. Recognizer 406 again provides lists of candidate pattern-types for each feature in each zone that is sent by processor 402. At block 612, processor 402 runs validation modules specified in the IFD file for each field in the form. Similarly, processor 402 runs validation modules specified in the IFD file for each group in the form at block 614. At block 616, processor 402 runs "post-processing" functions on the data validated at blocks 610, 612, and 614. For example, processor 402 can convert the data into an output file in a computer-readable format that includes the data extracted from the form.

In one embodiment of the present invention, system 400 is implemented on a programed computer in a Windows NT environment. FIGS. 12 through 15 are flow charts of threads of executable code of cooperating processes that run as console applications on a Windows NT system. Each flow chart is described in turn below. Communications between the threads is accomplished through TCP/IP using Windows sockets.

Figure 12:
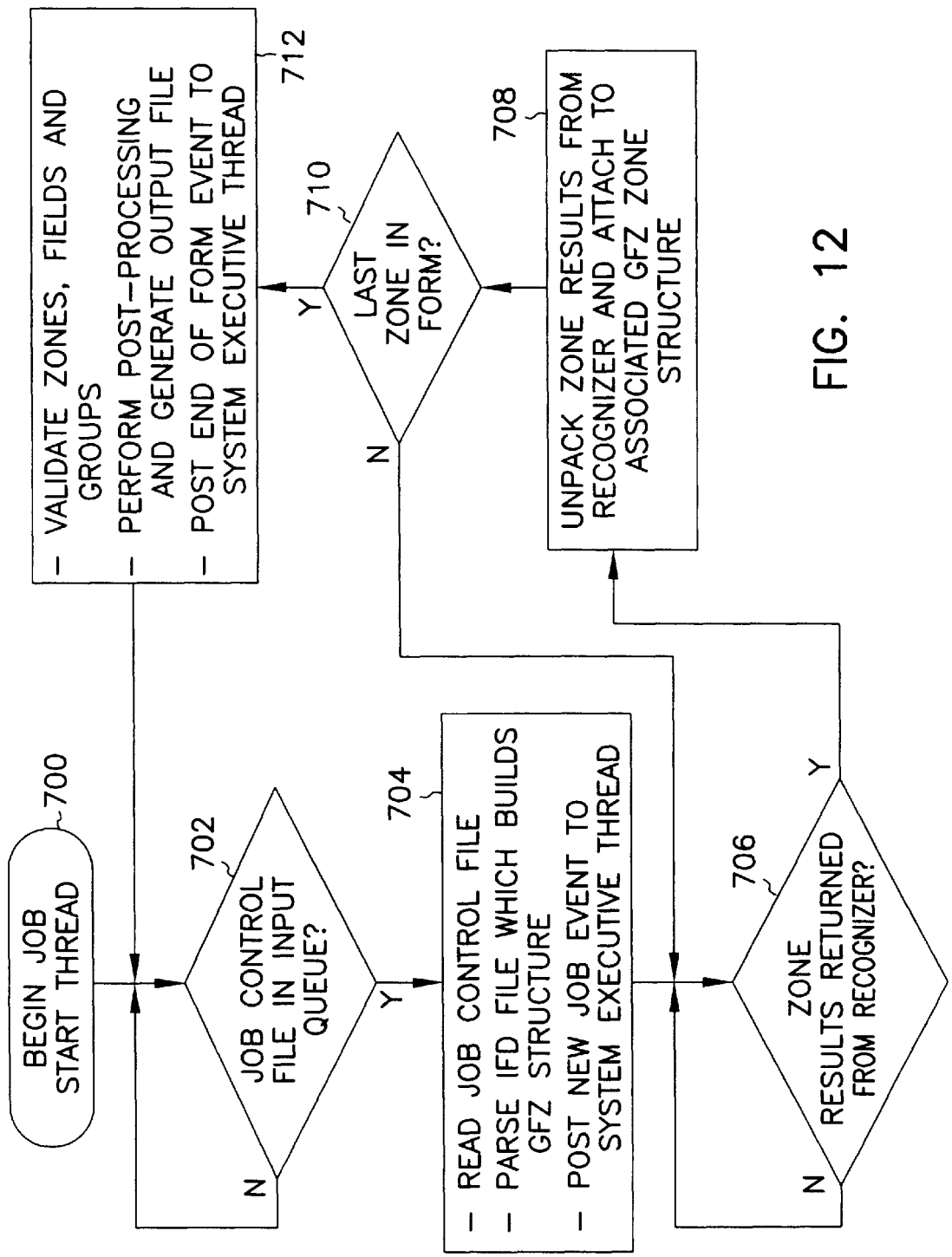
FIGS. 12 through 15 are flow charts of an illustrative embodiment of a process for processing images by the system of FIG. 9.

FIG. 12 is a flow chart that illustrates an embodiment of a job start thread. This thread initiates the processing of an image by system 400. The job start thread begins at block 700. At block 702, the job start thread determines whether a job control file is in the input queue of system 400. The job control file contains specifications related to the features of system 400 to be used in the current processing job. For example, the job control file indicates the name of the IFD file for the job, the name of the file containing the images to be processed, and other pertinent information for the job including, for example, the number of TIFF image files that are expected to be processed as part of the job. If the job start thread determines that there is no job control file in the queue, then the job start thread returns to 702. Otherwise, if there is a job control file in the queue, then the job start thread proceeds to block 704. At block 704, the job start thread reads the job control file. Further, the job start thread parses the IFD file. As described above, the IFD file contains information on the GFZ data structure for the forms to be processed during a job. From the information in the IFD file, processor 402 builds the GFZ data structure with pointers to validation modules and parameters placed in an execution list when the IFD is parsed. Further, at block 704 the job start thread posts a new job event to the system executive thread. This indicates that system 400 has begun processing the forms. The functions performed by the system executive thread are described in more detail below with respect to FIG. 14.

At block 706, the job start thread determines if recognizer 406 has returned results for a zone in the current form being processed. If the zone results have not yet been returned, the method returns to block 706 and repeats the inquiry until a positive response is received. Once results for a zone are received from recognizer 406, the job start thread proceeds to block 708 and unpacks the zone results and attaches the zone results to the GFZ data structure at the zone level.

At block 710, the job start thread determines if the zone results unpacked at block 708 are for the last zone in the form being processed. If the results have not been received for all of the zones, the job control thread returns to block 706. Otherwise, if results for all zones in the form have been received, the job start thread continues to block 712. At block 712, the job start thread causes processor 402 to apply the validation modules to the results from recognizer 406. Processor 402 first applies the validation modules to the zones. Once the zones have been validated, processor 402 proceeds to validate the results for the fields and groups of the form. Further, processor 402 generates an output file that contains the data extracted from the form by system 400. The job start thread then returns to block 702 to process further job control files in the input queue.

Figure 13:
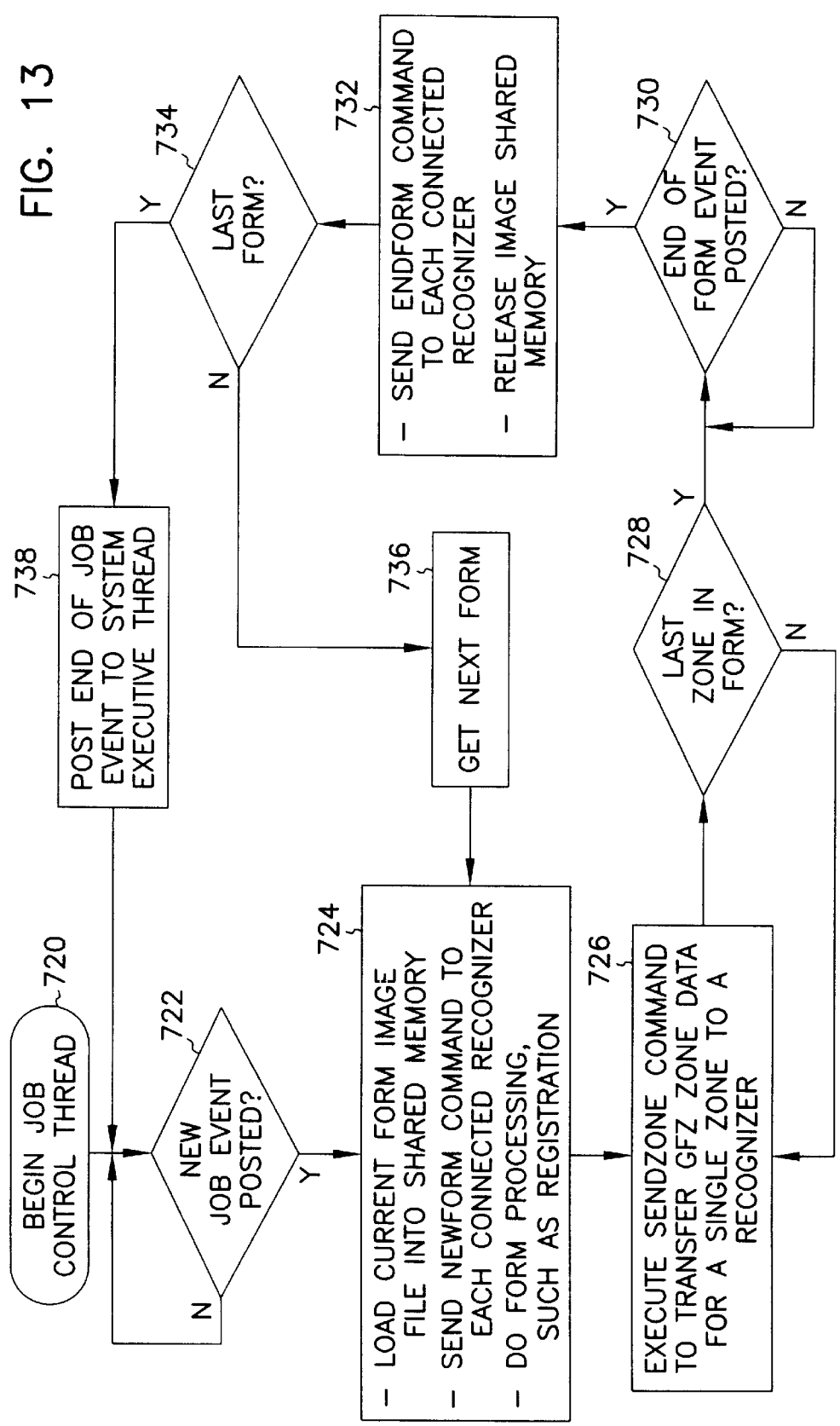

FIG. 13 is a flow chart that illustrates a job control thread for system 400 of FIG. 9 that controls the processing of a job by system 400. Job control thread begins at block 720. At block 722, the job control thread determines whether a new job event has been posted. If a new job event has not been posted, the job control thread returns to block 722 until a new job event has been detected. Otherwise the job control thread proceeds to block 724 and loads an image of the next form into a shared portion of memory 404 for processing. The job control thread sends a command to the recognizer 406 that indicates that a new form has been loaded into memory for processing. It is noted that recognizer 406 could include more than one recognizer of the type described above. At block 724, the job control thread is further operable to perform "form registration." Form registration is a type of validation module. Several examples of form registration are described below with respect to validation modules.

The job control thread then proceeds to block 726 and processor 402 executes a command to send data for a zone to recognizer 406. At block 728, the job control thread determines if the zone sent to recognizer 406 at block 726 is the last zone for the form being processed. If it was not the last zone, the job control thread returns to block 726 to send an additional zone to recognizer 406. If, however, the last zone has been sent to recognizer 406, the job control thread proceeds to block 730 where the job control thread determines whether an end of form event has been posted by the job start thread. If the end of form event has not been posted, the job control thread returns to block 730 until the end of form event is posted. Once the end of form event is posted, the job control thread proceeds to block 732.

At block 732, the job control thread sends an end of form command to recognizer 406 indicating that the current form has been fully processed by recognizer 406. Further, the job control thread releases the image of the form from shared memory 404. The job control thread then determines at block 734 if the last form processed by system 400 is the last form in the current job. If it is not the last form in the job, the job control thread proceeds to block 736 and gets the next form to be processed. The job control thread then proceeds to block 724 to process the next form.

If, at block 734, the job control thread determines that the last form in the job has been processes, the job control thread proceeds to block 738 and posts and end of job event to the system executive thread. The job control thread then returns to block 722 to begin processing the next new job event.

Figure 14:
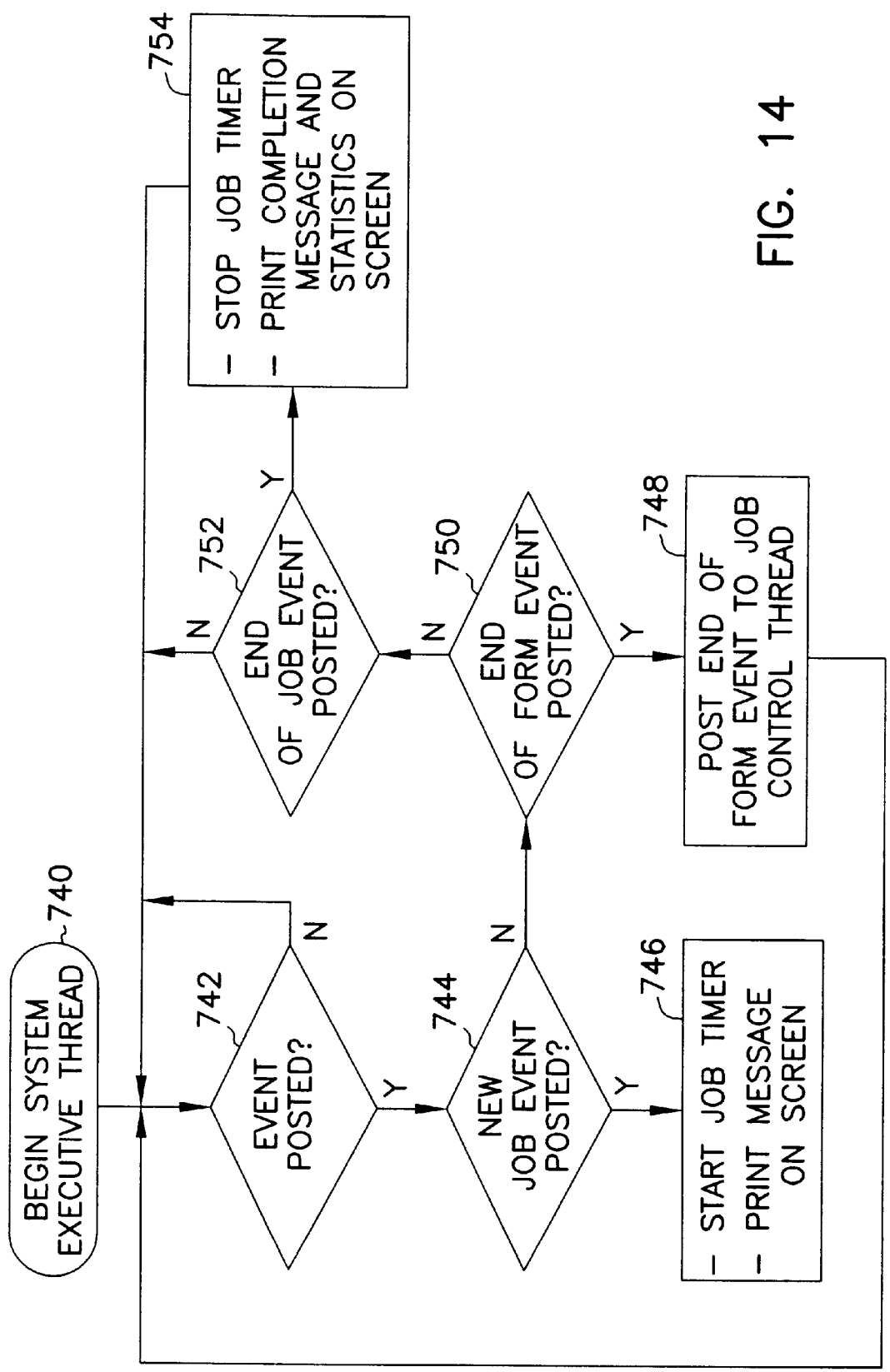

FIG. 14 is a flow chart that illustrates an embodiment of a system executive thread for use with system 400 of FIG. 9. The system executive thread controls a number of timers and other details of the operation of system 100. The system executive thread begins at block 740. At block 742, the system executive thread determines whether an event has been posted. If an event has not been posted, the system executive thread returns to block 742 until an event has been posted. When the system executive thread determines that an event has been posted, the method proceeds to block 744 and determines whether the event is a new job event. If the event is a new job event, then the system executive thread starts a time for the job and returns to block 742. If the event is not a job event, the system executive thread proceeds to block 750 and determines whether the event is an end of form event. If the event is an end of form event, the system executive thread proceeds to block 748 and posts an end of form event to the job control thread of FIG. 13. The system executive thread then returns to block 742. If, at block 750, the system executive thread determines that the event is not an end of form event, the system executive thread proceeds to block 752 and determines if the event is an end of job event. If the event is not an end of job event, the system executive thread returns to block 742. Otherwise, if the event is an end of job event, the system executive thread proceeds to block 754 and stops the job timer and prints a completion message with statistics for the job on a console attached to input/output circuit 410. The system executive returns to block 742.

Figure 15:
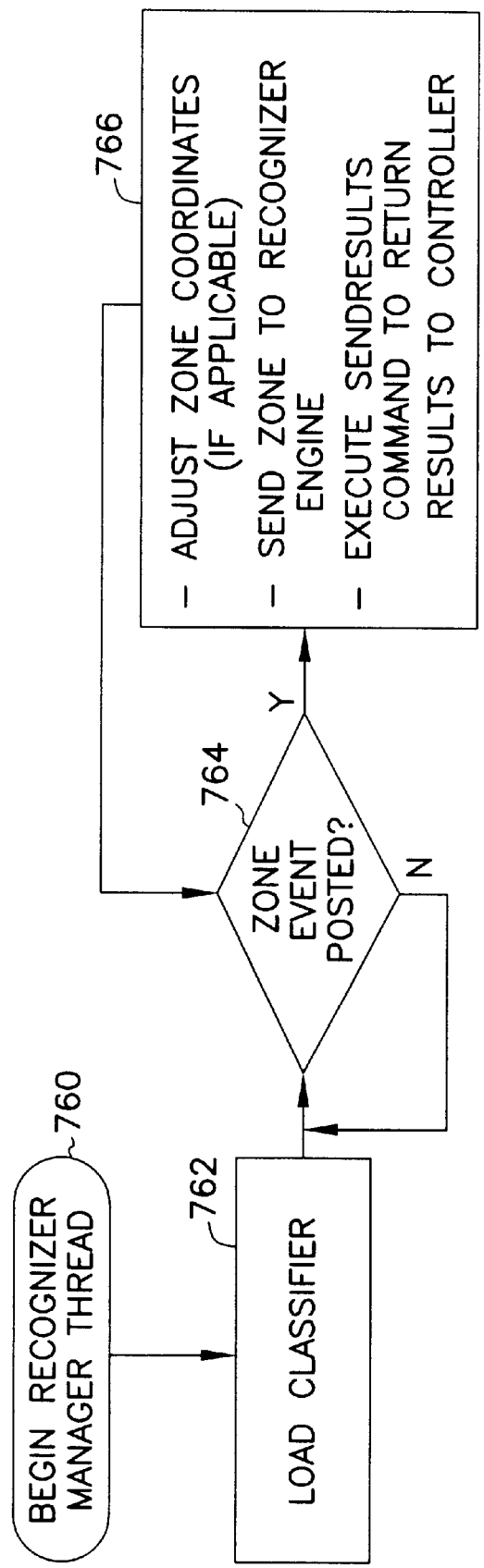

FIG. 15 is a flow chart that illustrates an embodiment of a recognizer manager thread for use by system 400 of FIG. 9. The recognizer manager thread controls the selection of the selection of the classifier for recognizer 406 for a particular job. It is noted that recognizer 406 can use more than one classifier. Further, it is noted that these multiple classifiers can be used for processing forms in the same job.

The recognizer manager thread begins at block 760. At block 762, the recognizer manager thread loads a classifier for recognizer 406 for use in processing forms for a job. At block 764, the recognizer manager thread determines whether a zone event has been posted by the job control thread. If the answer is no, then the recognizer manager thread returns to block 764 until a zone event is posted indicating that a zone can now be processed. When a zone event is posted, the recognizer manager thread proceeds to block 766. At block 766, the recognizer manager thread adjusts the coordinates of the zone, if necessary, as indicated by the form registration validation module. Further, the recognizer manager thread sends the zone to recognizer 406. Finally, the recognizer manager thread returns the results of from recognizer 406 to processor 402.

As described previously, system 400 uses validation modules to select among candidate characters identified by recognizer 406.

IV. Validation Modules

As described above, system 400 uses "validation modules" to select among candidate characters identified by recognizer 406. Recognizer 406 is rather like an extremely near-sighted person who can only see one character at a time without regard to the adjacent characters. The raw results from recognizer 406 must be further processed to produce accurate, useable data. This function is performed by the validation modules.

For a pattern recognition system to operate, the system must perform the recognition process regardless of the content and layout of a form. The type of validation modules or procedures that will produce acceptable pattern recognition data is often tightly coupled with the form or image being processed. Some forms will need to verify a wide variety of data while other forms may only require validation of a smaller set of data. Thus, a straight forward approach to the design of a pattern recognition system would require that the validation modules be statically linked with the recognizer for a specific application. Such a recognizer would have limited commercial value. According to one aspect of the present invention, the functions of recognition and validation have been advantageously decoupled so as to allow a single system to be easily modified for use with a wide variety of forms or images.

To implement this decoupling, a controller process builds execution lists of sub-programs within the GFZ structure. Since the sub-program entry points are resolved to pointers rather than symbolic names, and the particular routines are not known until run-time, there is no static linking which would be required every time a routine is added, deleted or changed. In other words, there is no run-time library of validation routines in the conventional sense.

A validation module is a sub-program that resides in one of a number of dynamic link libraries (DLLs). At run-time, the controller, using the appropriate WIN32 calls, explicitly loads the DLLs for all the validation modules to be used for a job and retrieves pointers to the validation routines.

The validation modules used to select among candidate pattern-types in a class depend on the specific application. Some examples of validation modules that can be used in the character recognition area are described below. However, it is understood that these validation modules are provided by way of example and not by way of limitation. Other validation modules can be used without departing from the spirit and scope of the present invention.

Figure 20:
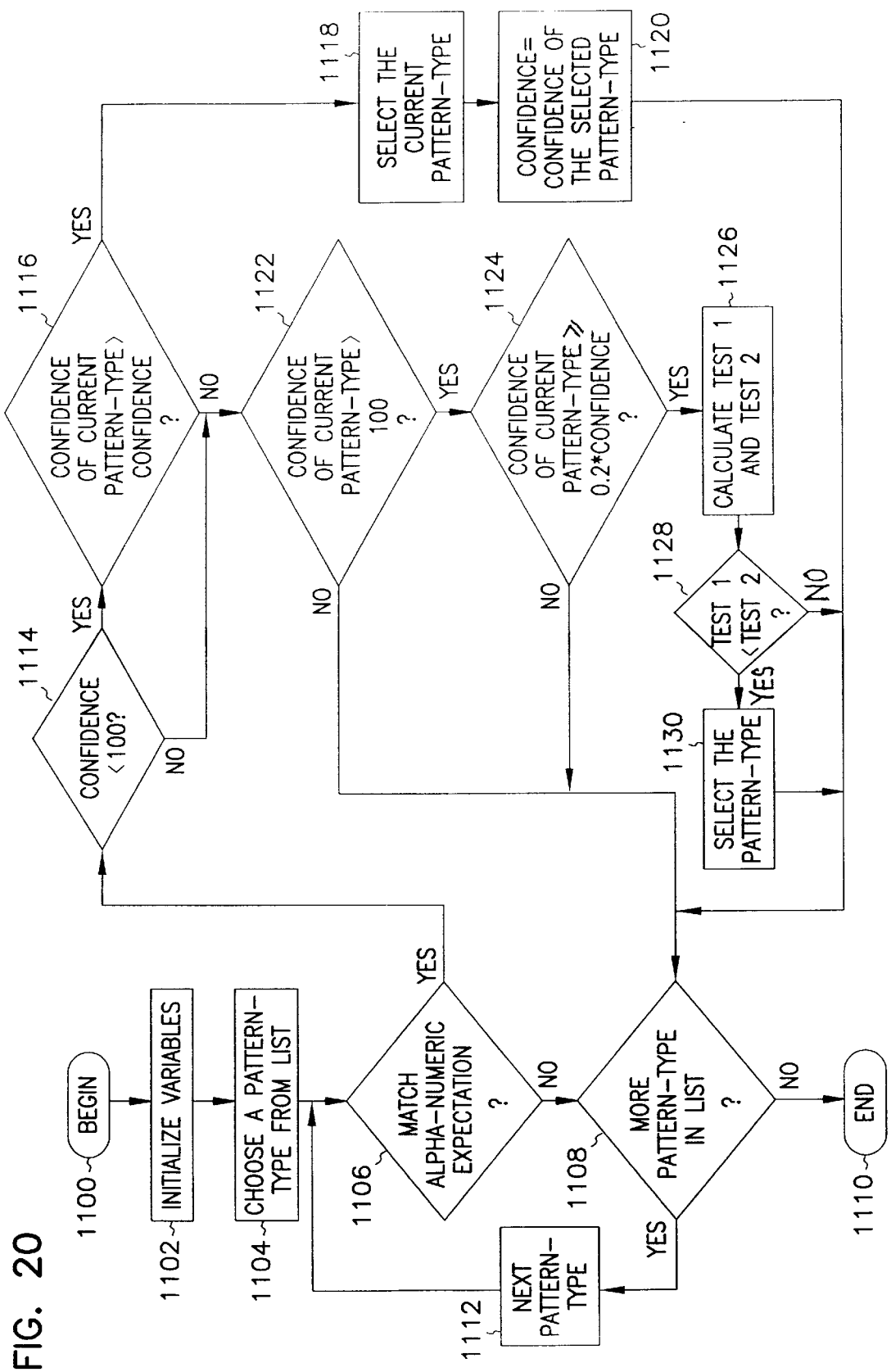

Confidence and Noise As described above, each class in the classifier includes an indication of the "confidence" and "noise" for each pattern-type in the class. An embodiment of method for a validation module that uses these factors to select a pattern-type is shown in FIG. 20. The method begins at block 1100 and considers the confidence and noise of each pattern-type sequentially to determine the most likely candidate. At block 1102, the method initializes variables that are used to track the value of the confidence, noise and identity of the pattern-type that is selected as the method processes each pattern-type. Specifically, as the individual pattern-types are processed, the method uses these variables to store the confidence and noise values for a pattern-type unless and until the method determines that a different pattern-type has better values based on specified criteria defined below. At block 1104, the method chooses the first pattern-type from the class list. At block 1106, the method determines if the current pattern-type matches the expected kind of pattern. For example, the IFD file may indicate that the zone contains only alpha, only numeric or a combination of alphanumeric characters. If the pattern-type is not the kind of character expected, e.g., the pattern-type is numeric and alpha is expected, then the method proceeds to block 1108 and determines if more pattern-types in the class list have not yet been processed. If all of the pattern-types in the class list have been processed, then the method proceeds to block 1110 and ends.

At block 1108, if the method determines that more pattern-types in the class list have not been processed, the method proceeds to block 1112 and selects the next pattern-type from the class list. The method returns to block 1106.

At block 106, if the method determines that there is a match, e.g., alpha characters are expected in the zone and the pattern-type is an alpha character, then the method proceeds to block 1114. At block 1114, the method determines whether the current value of the confidence variable is less than 100. If the confidence variable is less than 100, this means that less than 100 patterns of the selected pattern-type produced the numerical representation for this class when the classifier was created. Such a value for the confidence variable makes selection of the selected pattern-type questionable. It is noted that a value other than 100 can be substituted here without departing from the spirit and scope of the present invention. If at block 1116, the method determines that the confidence of the current pattern-type is greater than the confidence variable (from the selected pattern-type), the method proceeds to block 1118 and selects the current pattern-type. At block 1120, the method stores the confidence and noise values of the current pattern-type in confidence and noise variables and marks the current pattern as the selected pattern-type (most likely candidate). The method then returns to block 1108 and determines if more pattern-types need to be processed.

If at blocks 1114 the method determines that there is sufficiently high confidence in the current selection, or at block 1116 the method determines that the confidence associated with the current pattern-type is not as good as selected pattern-type, the method proceeds to block 1122. At block 1122, the method determines whether the confidence for the current pattern-type is greater than 100. If the confidence level is less than 100, the method returns to block 1108 and does not use the current pattern-type. If, however, at block 1122, the method determines that the confidence of the current pattern-type is greater than 100, the method proceeds to block 1124 and determines whether the confidence of the current pattern-type is greater than or equal to twenty percent of the value of the confidence variable. If the answer is no, this means that the confidence of the current pattern-type is not sufficiently high enough to justify considering the pattern-type further.

If at block 1124, the method determines that the confidence of the current pattern-type is greater than or equal to twenty percent of the value of the confidence variable, the method will determine whether the noise factor for the current pattern-type justifies selecting the current pattern-type even though the confidence level of the current pattern-type is less than the selected pattern-type. At block 1126, the method calculates to test values, TEST1 and TEST2. TEST1 is the ratio of the noise to confidence for the current pattern-type. TEST2 is the ratio of the noise to confidence for the selected pattern-type. At block 1128, the method determines whether TEST1 is less than TEST2. If the answer is no, this means that the decrease in confidence by going to the current pattern-type is not offset by a sufficient decrease in noise as compared to the selected pattern-type and the method proceeds to block 1108. If the answer at block 1128 is yes, the method proceeds to block 1130 and selects the current pattern-type and returns to block 1108.

Zones With Multiple Features

Figure 21A:
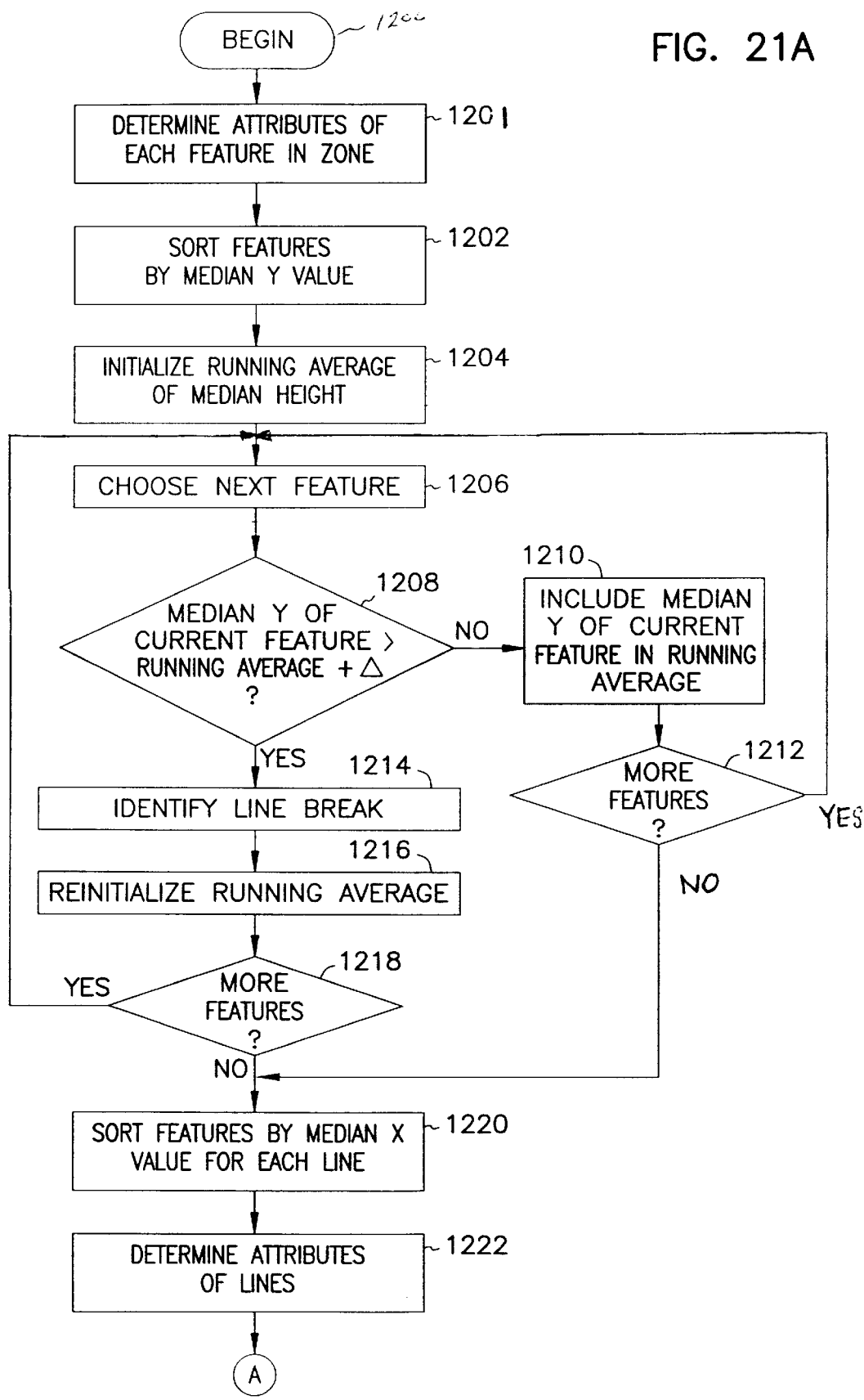
Figure 21B:
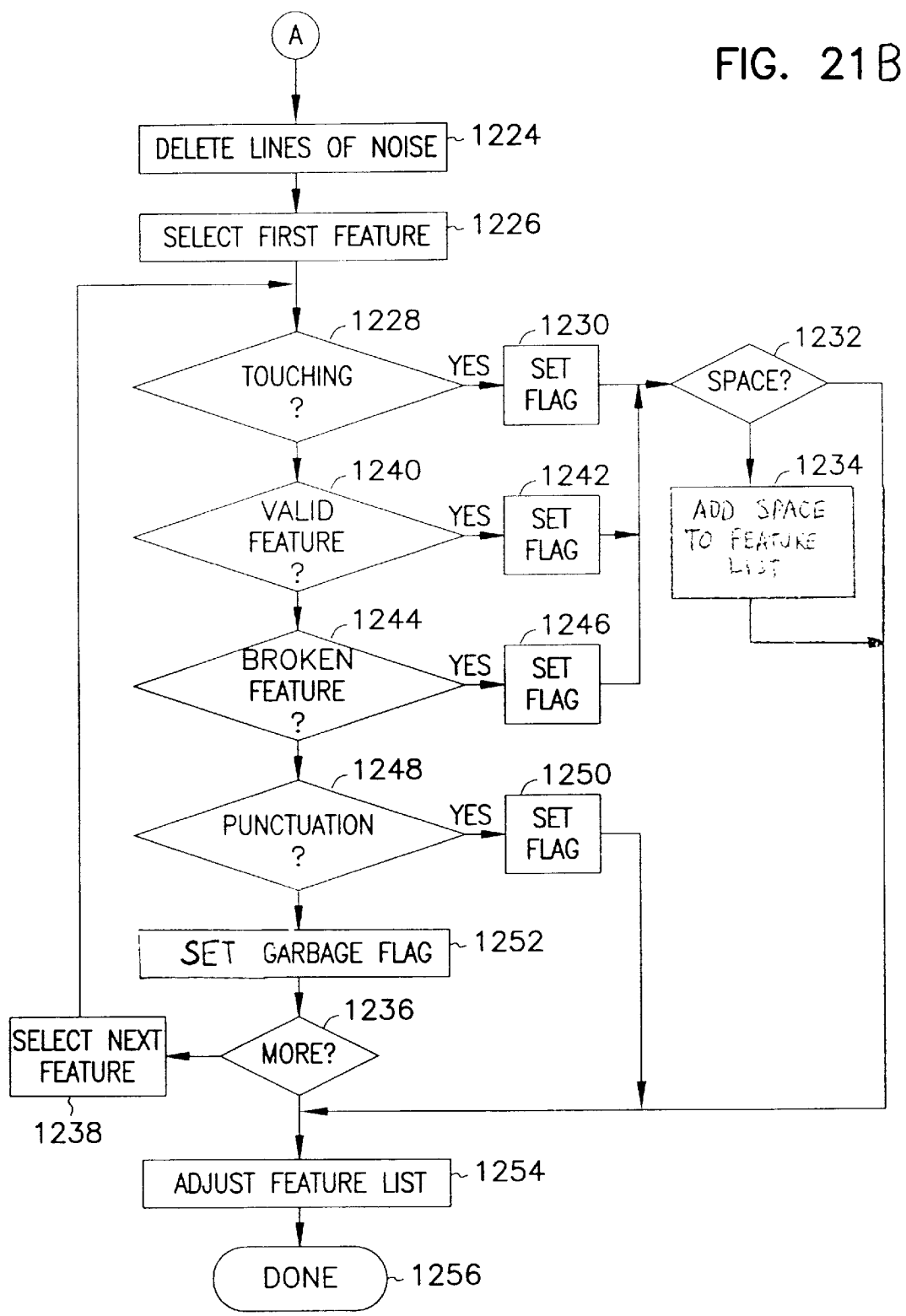

FIGS. 21A and 21B are flow charts that illustrate aspects of a method for a validation module that processes zones that can contain multiple features. The results produced by recognizer 406 do not indicate the relative positioning of the features in a human readable format. Recognizer 406 simply indicates the location of the features in the zone without any consideration to how they would be grouped for human perception. Thus, this validation module sorts through the data and places the features in a list in an order for conversion to human readable format. The method begins at block 1200. At block 1201, the method determines attributes of each feature in the zone. For example, the method determines the coordinates of the center of each feature. These coordinates are referred to as "median X" and "median Y." Further, the method identifies the largest and smallest features in the zone as well as the average height and width of the features in the zone.

At 1202, the method sorts the features in the zone by their median Y value. In this manner all features that represent contiguous characters on the image are grouped together. Next, the method determines where each line of data ends and the next line of data begins (assuming that there are multiple lines of data in the zone being processed). At block 1204, the method initializes a running average of the median height of features to be used in determining line breaks. At block 1206, the method enters a loop and chooses the next feature to be processed by this loop. At block 1208, determines whether the median Y of the current feature is greater than the running average plus a delta value. If the answer is no, then the current feature is not on the next line and the method proceeds to block 1210. The median Y value of the current feature is included into the running average. At block 1212, the method determines whether there are more features in the zone. If there are more features, the method returns to block 1206. If there are no more features, the method proceeds to block 1220.

At block 1208, if the method determines that the median Y of the current feature exceeds the running average by at least the delta value, the method identifies the current feature as the beginning of a new line and marks the line break at block 1214. At block 1216 the running average is reinitialized. It is noted that the running average is used for comparison to prevent false readings when a character with a tail such as a "q," "y," "g" or the like is encountered on the current line. The running average gives a better comparison for measuring the relative positions of characters on different lines. At block 1218 the method determines whether more features need to be processed. If there are more features, the method returns to block 1206. If all of the features have been grouped into lines, the method proceeds to block 1220 and sorts the features in each line by their median X value. This places each feature in each line in the proper sequence. Thus, when the results from system 400 are viewed by a user the features will be in human readable order.

At block 1222, the method determines additional attributes of the features in the zone. For example, the method can determine such data as: the baseline for each line of features in the zone, the height of upper and lower case characters in the zone, the distance between midpoints of features, the average height and width of the features in the zone, and the width of spaces in the zone. It is noted that this list is not intended to be all inclusive. Rather, other appropriate data may be derived from the features in the zone for use with other validation modules in selecting among multiple candidate pattern-types in a class.

At block 1224 (FIG. 21B), the method deletes any lines that consist entirely of noise. A line of noise can be identified by, for example, determining if more than half of the features in a line consist of features that are smaller than the average height or width for the zone.

Figure 18D:
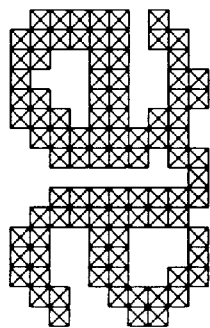
FIGS. 18A through 18E are diagrams of digital images that illustrate aspects of various validation modules according to the teachings of the present invention.

At block 1226, the method initiates a loop by selecting the first feature in the zone. At block 1228, the method determines whether the current feature consists of more than one character. For example, the method can compare the aspect ratio of a feature to an acceptable ratio to determine if the feature is too wide to be an acceptable character, e.g., this test would determine that the letters "a" and "e" in FIG. 18D are touching. At block 1230, the method sets a flag for the feature to indicate that the feature needs to be divided and resent to recognizer 406. The method proceeds to block 1232 and determines whether there is a space after the current feature. If the answer is yes, the method adds a space indicator to the list of features. If there is no space, the method proceeds to block 1236 and determines whether there are more features in the zone. If there are more features, the method proceeds to block 1238 and selects the next feature. The method then returns to block 1228 and processes the next feature.

If at block 1228, the method determines that the feature does not represent touching characters, the method proceeds to block 1240 and determines whether the feature is a valid feature. If the feature is valid (e.g., based on size), then the method sets a flag to indicate that the feature is valid at block 1242 and proceeds to block 1232.

Figure 18B:
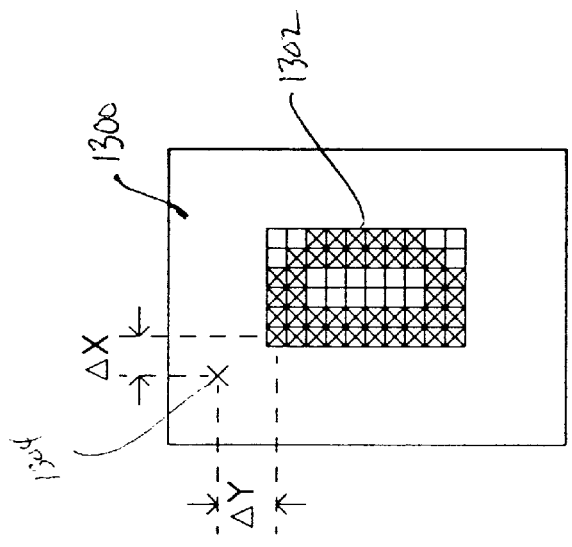
Figure 18E:
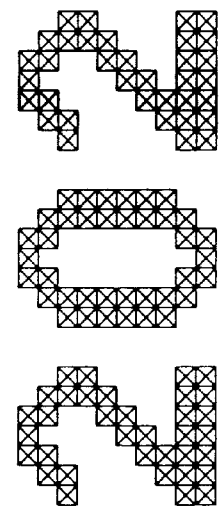
Figure 18A:
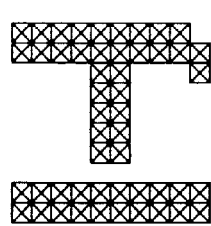

If at block 1240 the method determines that the feature is not valid, the method proceeds to block 1244 and determines if the feature represents a portion of a broken character such as the letter "H" in FIG. 18A. If the answer is yes, the method sets a flag at block 1246 to indicate that this feature starts a character that is broken into pieces. The method further determines how many pieces are in the broken character based on median X, median Y, etc. of the next adjacent features. The method skips over these features and determines if there is a space after the last feature in this broken character at block 1232.

If at block 1244 the method determines that the feature does not relate to a broken character, the method proceeds to block 1248 and determines whether the feature is a punctuation mark using information such as the height and position of the feature. If the feature is punctuation, the method sets a flag at 1250 and proceeds to block 1236. If the method determines that the feature is not punctuation, the method proceeds to block 1252 and marks the feature as garbage. The method proceeds to block 1236.

When at block 1236 the method determines that there are no more features, the method proceeds to block 1254 and adjusts the feature list to delete non-characters such as garbage and punctuation and to add indications of the locations of spaces. The method is finished with the processing of the data for the zone at block 1256.

Data Base Searches

In some circumstances, a number of features will combine to produce a information that can be verified by a look-up in an appropriate data base. For example, names, addresses, telephone numbers, etc. can be readily verified by resort to a database.

Figure 19:
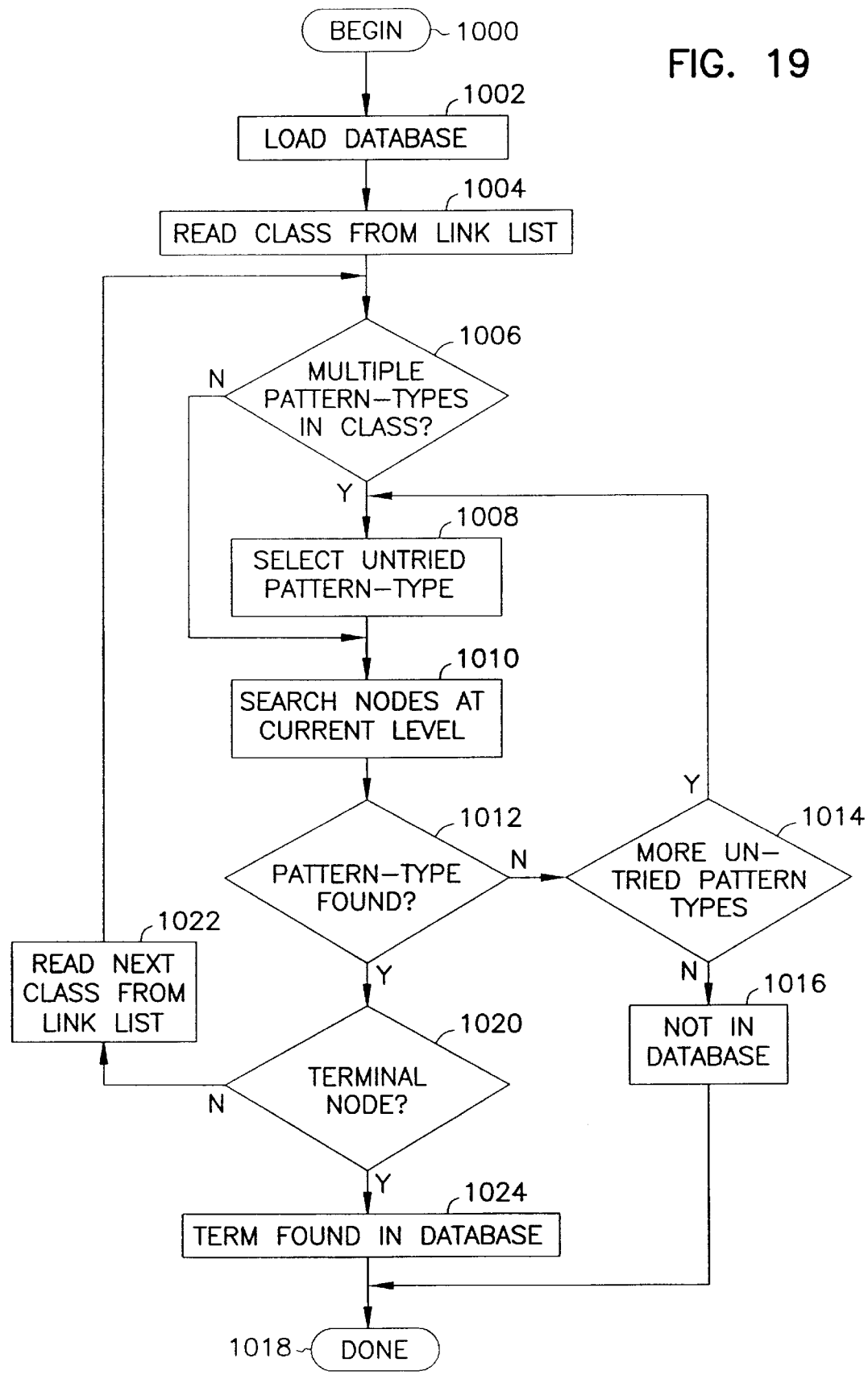
FIGS. 19, 20, 21A and 21B are flow charts that illustrate the operation of various validation modules according to the teachings of the present invention.

FIG. 19 is a flow chart that illustrates an embodiment of a validation module that can be used to search a database when selecting among various pattern-types in a class. The method begins at block 1000. At block 1002, the method loads a data base into memory 404. At block 1004, the method reads the class of pattern-types from the linked list for the first feature. At block 1006, the method determines whether there are multiple pattern-types in the class for this feature. If there are multiple pattern-types, the method proceeds to block 1008 and selects an untried pattern-type and proceeds to block 1010. If, at block 1006, there is only one pattern-type, the method proceeds to block 1010.

At block 1010, the method searches the nodes of the database at the current level for the pattern-type. At block 1012, the method determines whether the pattern-type was found. If it was not found, the method proceeds to block 1014 and determines if there are more untried pattern-types in the current class. If the answer is yes, the method returns to block 1008. If, however, the answer is no, the method proceeds to block 1016 and indicates that the combination of features does not produce an entry in the data base.

If, however, at block 1012, the method determines that the pattern-type is found in the current level of the data base, the method proceeds to block 1020 and determines whether the node for the pattern-type is a terminal node for a term in the data base. If the answer is no, the method proceeds to block 1022 and reads the class list for the next feature in the linked list. The method proceeds to process this class list by returning to block 1006. If, however, the method determines at block 1020 that the node is a terminal node, the method proceeds to block 1024 and indicates that the term was found in the data base. The method terminates at block 1018.

Registration

When multiple forms are scanned, there is inevitably some variation from form to form. For example, line may be dropped at the top and edge of one form that are not dropped on another form. Thus, since the zones of the GFZ data structure are defined typically using a graphical user interface to mark-up a sample form, it may be necessary to adjust coordinates of zones from form to form to account for differences in scanning. This is accomplished by one of several possible "registration" validation modules.

Figure 18C:
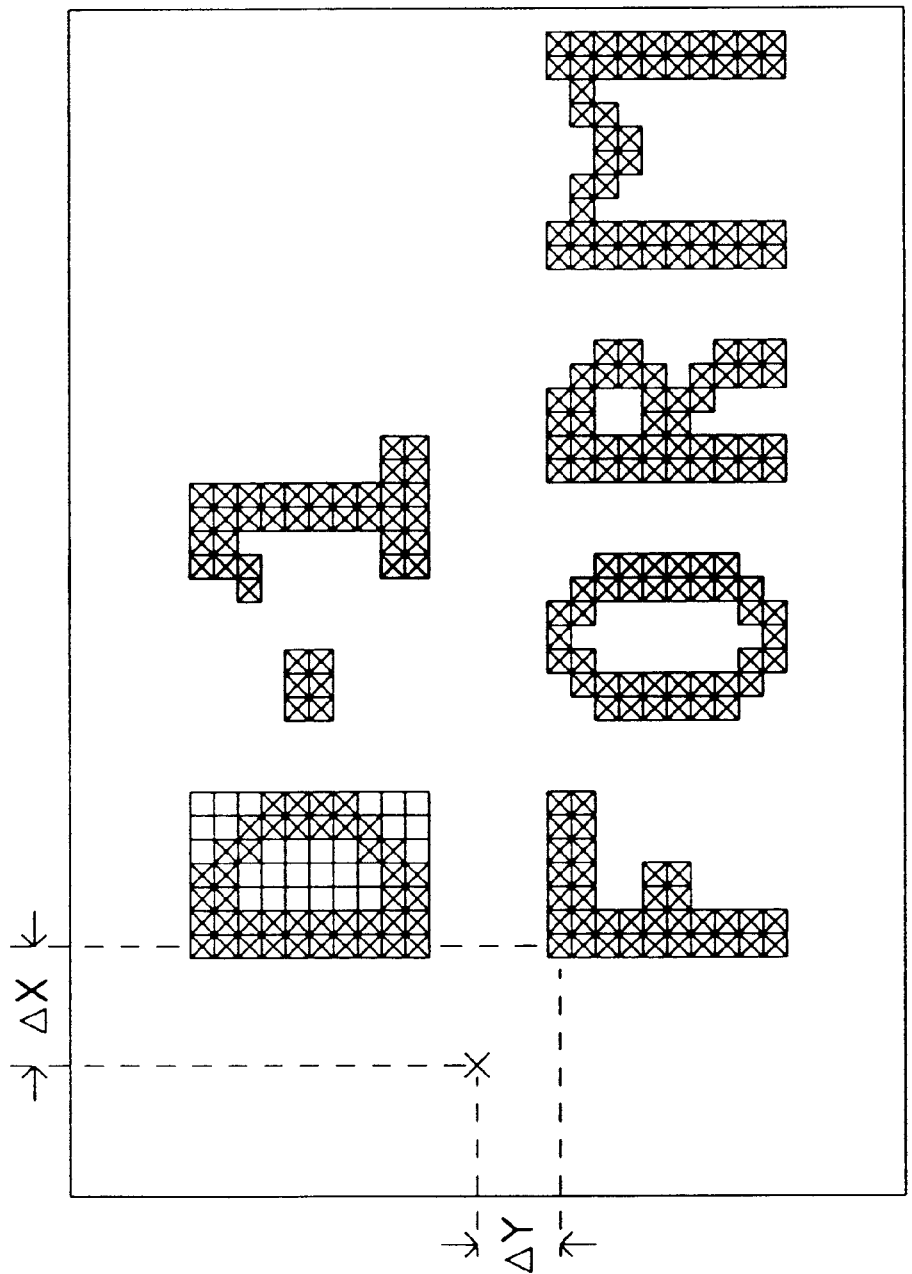

As a first example, FIG. 18B includes registration zone 1300 in which image 1302 of a letter "D" is provided. Image 1302 is displaced from its expected location as indicated by registration mark 1304. The validation module calculates the displacements, $\Delta X$ and $\Delta Y$, for use in adjusting the boundaries of zones as they are sent to recognizer 406. In some circumstances, the validation module can be instructed to key off from the edges of the first feature that is encountered in the zone. In alternative embodiments, the validation module can be instructed to look for a character of a specified type in the zone and use the edges of that feature to calculate the displacements. In further embodiments, the validation module can be instructed to look for a specified line in a zone or specified feature in a specified line in the zone to use for calculating the displacement. For example, in the example shown in FIG. 18C, the validation module was instructed to calculate the displacements based on the letter "F" in the second line of data in the registration zone.

Other

Validation modules can be included in the libraries of system 400 that use other tricks to select the most likely candidate of a class. For example, validation modules can be included that: remove features that are too big or too small, adjust the zoom factor applied to the feature, create strings of data from the features, create data in file formats per specifications of the end user, place strings of numbers in formats for telephone numbers, file numbers, social security numbers, etc.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the invention has been described primarily in the context of generating a classifier for an optical character recognition system. The invention has applications in a much wider range of fields. For example, as mentioned earlier, other embodiments of the present invention can be used in areas such as medicine, transportation, robotics, etc. Further, many of the variables with respect to identifying transformers and generating patterns can be changed for a specific application without departing from the spirit and scope of the present invention.

What is claimed is:

1. The method for generating a classifier, comprising the steps of: collecting sample patterns that are representative of data to be processed by the classifier; generating sample pattern signals that represent the sample patterns for processing;

generating a number of transformers;

identifying the transformers that map between sample patterns of the same pattern-type in the collected sample patterns;

generating additional patterns with the identified transformers and the sample pattern signals;

forming a table that contains the generated patterns and an indication of the pattern-type to which each pattern belongs;

testing the table of the classifier with some of the collected sample patterns to measure the accuracy of the classifier; and repeating the steps of generating additional patterns and forming a table until the measure accuracy does not provide an acceptable improvement.

2. The method of claim 1, wherein steps in determining when the measured accuracy does not provide an acceptable improvement comprise:

determining if the transformers correctly map sample patterns and same pattern-types;

discarding transformers which incorrectly map sample patterns to same pattern-types; and determining a statistical measure for the transformer and recording the statistical measure in a fitness matrix.

3. The method of claim 1, and further comprising the step of re-seeding the sample patterns used to identify the transformers when the measure of the accuracy does not improve and the size of the classifier is not acceptable.

4. The method of claim 1, wherein the step of identifying the transformers that map between sample patterns of the same pattern-type comprises the steps of generating and testing transformers using a genetic algorithm.

5. The method of claim 4, wherein the step of using a genetic algorithm comprises the step of applying a point mutation to a transformer.

6. The method of claim 4, wherein the step of using a generic algorithm comprises the step of applying a cross over algorithm to at least two transformers.

7. The method of claim 4, wherein the step of using a generic algorithm (58) comprises the step of applying an aging algorithm to a transformer.

8. The method of claim 1, wherein the step of generating additional patterns comprises the step of applying the identified transformers to the sample patterns.

9. The apparatus for generating a classifier, comprising:

means for collecting sample patterns that are representative of data to be processed by the classifier;

means for generating sample pattern signals that represent the sample patterns for processing;

means for generating a number of transformers;

means for identifying the transformers that map between sample patterns of the same pattern-type in the collected sample patterns;

means for generating additional patterns with the identified transformers and the sample pattern signals;

means for forming a table that contains the generated patterns and an indication of the pattern-type to which each pattern belongs;

means for testing the table of the classifier with some of the collected sample patterns to measure the accuracy of the classifier; and means for repeating the generation of additional patterns and forming a table until the measure accuracy does not provide an acceptable improvement.

10. The apparatus of claim 9, wherein means for determining when the measured accuracy does not provide an acceptable improvement comprise:

means for determining if the transformers correctly map sample patterns and same pattern-types;

means for discarding transformers which incorrectly map sample patterns to same pattern-types; and means for determining a statistical measure for the transformer and recording the statistical measure in a fitness matrix.

11. The apparatus of claim 9, and further comprising a means for re-seeding the sample patterns used to identify the transformers when the measure of the accuracy does not improve and the size of the classifier is not acceptable.

12. The apparatus of claim 9, wherein the means for identifying the transformers that map between sample patterns of the same pattern-type comprises a means for generating and testing transformers using a genetic algorithm.

13. The apparatus of claim 12, wherein the means for using a genetic algorithm comprises a means for applying a point mutation to a transformer.

14. The apparatus of claim 12, wherein the means for using a generic algorithm comprises a means for applying a cross over algorithm to at least two transformers.

15. The apparatus of claim 12, wherein the step of using a generic algorithm comprises a means for applying an aging algorithm to a transformer.

16. The apparatus of claim 9, wherein the means for generating additional patterns comprises a means for applying the identified transformers to the sample patterns.

* * * * *